United States Patent [19]

Watanabe et al.

[11] Patent Number: 4,760,458
[45] Date of Patent: Jul. 26, 1988

[54] IMAGE PROCESSING SYSTEM

[75] Inventors: Yasuhiro Watanabe, Yokohama; Fumio Furukawa, Tokyo, both of Japan

[73] Assignee: Canon Kabushiki Kaisha, Tokyo, Japan

[21] Appl. No.: 660,925

[22] Filed: Oct. 15, 1984

[30] Foreign Application Priority Data

Oct. 17, 1983 [JP] Japan .................. 58-193862

[51] Int. Cl.[4] ............................... H04N 1/00
[52] U.S. Cl. ..................... 358/256; 358/280; 358/286
[58] Field of Search ............... 358/256, 280, 293, 286, 358/80; 364/200, 514; 340/734; 382/56, 57

[56] References Cited

U.S. PATENT DOCUMENTS

| | | | |
|---|---|---|---|
| 4,110,794 | 8/1978 | Lester et al. | 358/256 |
| 4,414,636 | 11/1983 | Ueda et al. | 358/80 |
| 4,491,873 | 1/1985 | Takayama | 358/256 |
| 4,587,633 | 5/1986 | Wang et al. | 358/256 |

FOREIGN PATENT DOCUMENTS

| | | |
|---|---|---|
| 51226A2 | 5/1982 | European Pat. Off. . |
| 2078411A | 1/1982 | United Kingdom . |
| 2082014A | 2/1982 | United Kingdom . |

OTHER PUBLICATIONS

"An Experimental Text-Image Workstation", Siemens Forsch.-u. Entwickl.-Ber., vol. 12, No. 1, pp. 55-60.

Primary Examiner—Edward L. Coles, Sr.
Attorney, Agent, or Firm—Fitzpatrick, Cella, Harper & Scinto

[57] ABSTRACT

An image processing system constructed with a processing unit for editing read-out images, display unit for displaying transmitted images, and a printer for printing the images based on image data, wherein the processing unit transfers edited image data to both a display unit and a printer at the same time.

14 Claims, 21 Drawing Sheets

| | IMAGE INPUT | | |
|---|---|---|---|
| | 2 (11) | 5 (15) | 1 (14b) |
| 3 (12) | 72 | 52 | 61 |
| 6 (16) | 73 | 53 | 62 |
| 7 (10) | 74 | 54 | 63 |
| 1 (14a) | 71 | 51 | — |

IMAGE OUTPUT

FIG. 7

VIDEO —— XXXXX ──────── XXXXX
        \___/            \___/
         MD               ID

FIG. 8

| MD BITS (THINNING OUT COMMAND) | | | | SHEET SIZE | CONDENSING RATIO |
|---|---|---|---|---|---|
| BIT 1 | BIT 2 | BIT 3 | PARITY BIT | | |
| 0 | 0 | 0 | 0 | NOT THINNING OUT SIGNAL LINE | R1 |
| 0 | 0 | 1 | 0 | A3 | R2 |
| 0 | 1 | 0 | 0 | A4 | R3 |
| 0 | 1 | 1 | 1 | A5 | R4 |
| 0 | 0 | 0 | 0 | B3 | R5 |
| 1 | 0 | 1 | 1 | B4 | R6 |
| 1 | 1 | 0 | 1 | B5 | R7 |
| 1 | 1 | 1 | 0 | B6 | R8 |

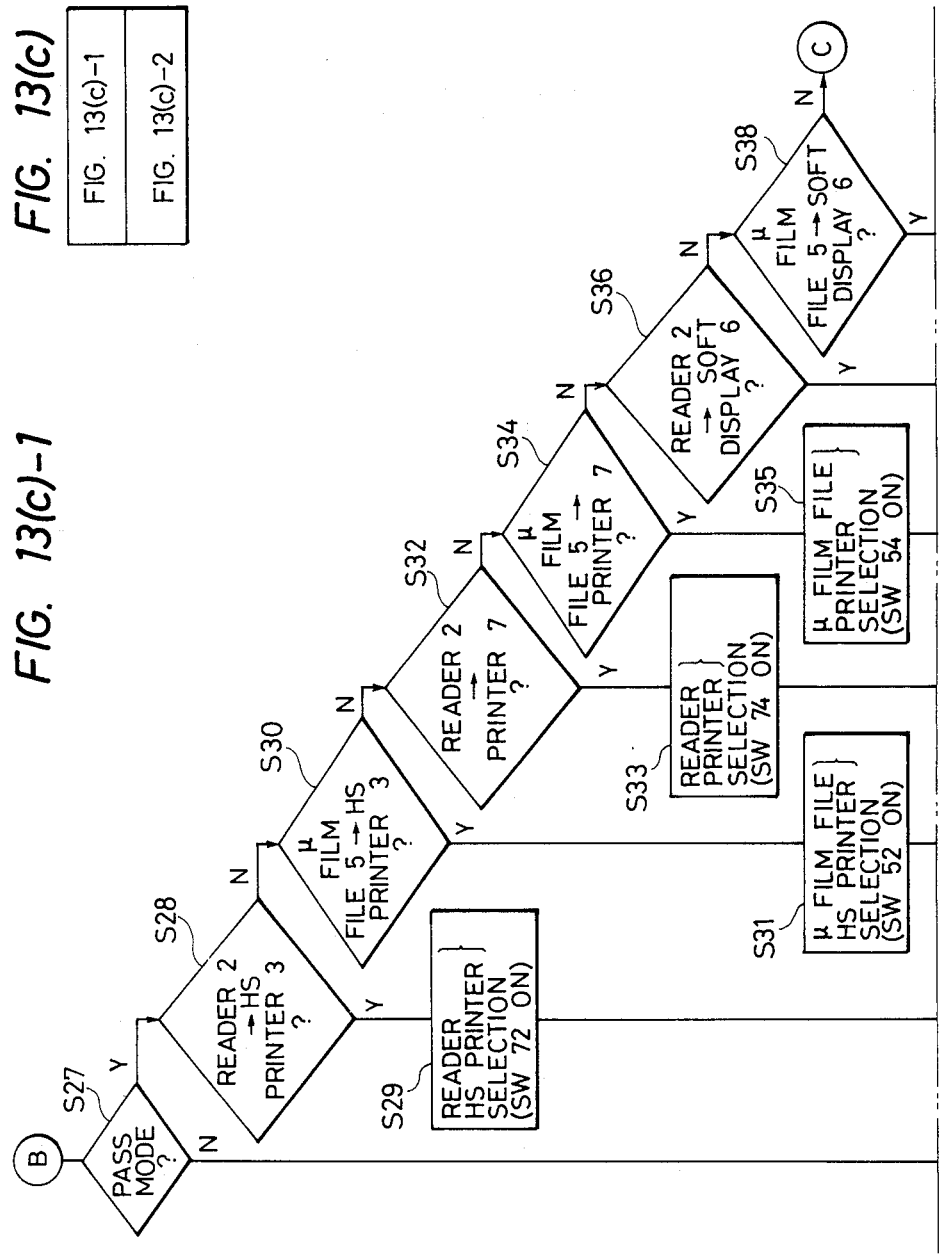

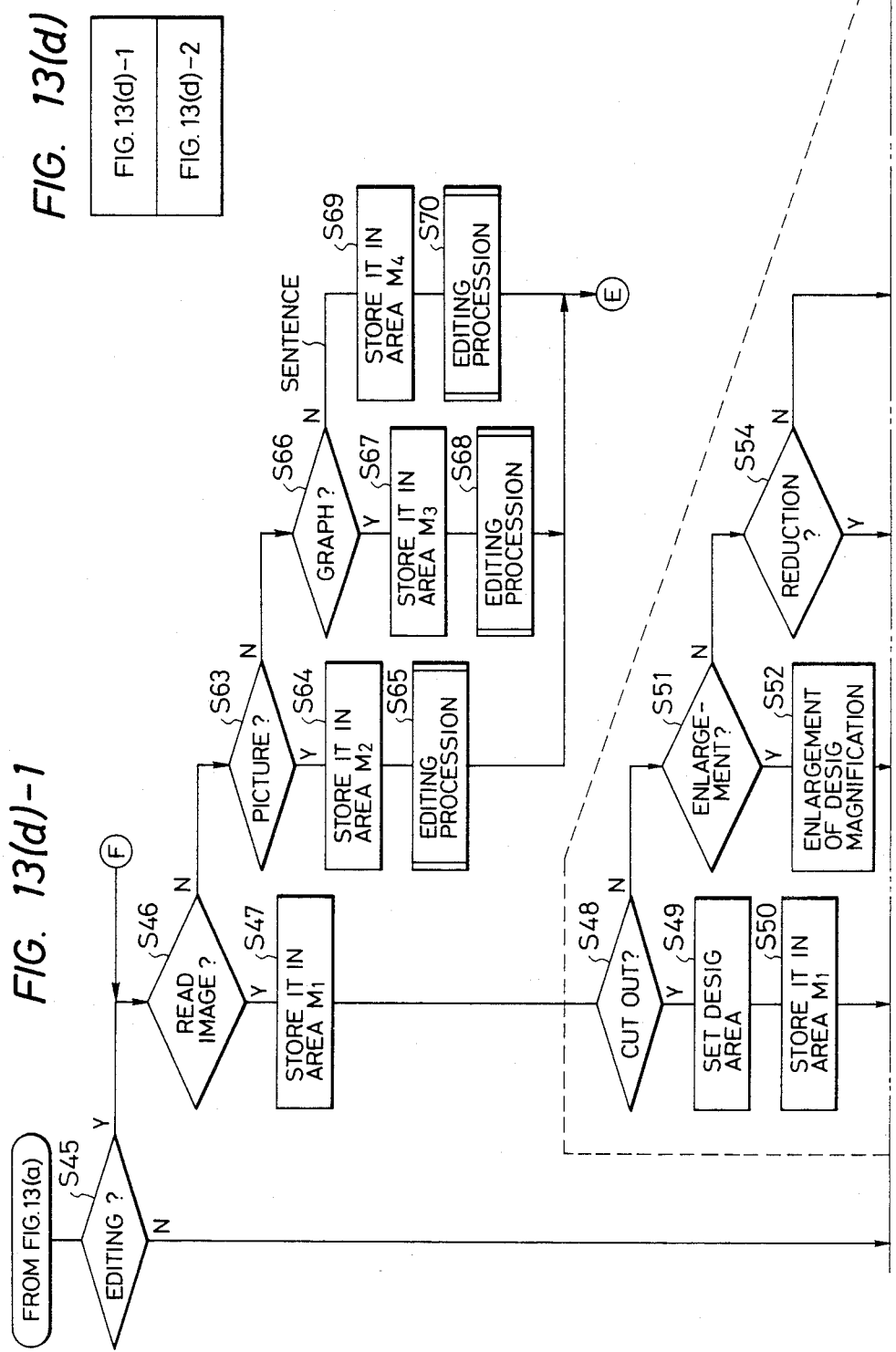

IMAGE PROCESSING SYSTEM

BACKGROUND OF THE INVENTION

1. Field of the Invention

The present invention relates to an image processing system for processing image information in the form of electrical signals.

2. Description of the Prior Art

There is already known in the art image recording in response to image signals obtained by photoelectrically reading image information, or transmission of said signals to a distant location. One of the advantages of processing the image information in the form of electrical signals lies in the possibility of forming a so-called network composed of plural stations for image signal processing mutually connected through transmission channels, thus enabling arbitrary signal transmission among said stations.

However, in such network system, it is difficult to display the read-out image on the display section of a CRT, etc. or the display section of a work-station having a keyboard, etc., and to transmit the read-out image which has been edited in a dialog system to a plurality of other work stations connected to the network, thereby performing display, printing, and so forth. Also, on the part of the image to be transmitted from the work station, it is not possible to transmit only a part of the image displayed on the CRT of the work station. Further, it is difficult to select the destination where the output is to be sent in both cases of outputting information produced at a certain work station to an output device in that work station and of transmitting such information to another work station.

SUMMARY OF THE INVENTION

The present invention has been made in view of the above-mentioned disadvantages inherent in the known apparatuses, and aims at providing an image processing system which is constructed with a processing device to edit and display the read-out image, a device for displaying the transmitted image, and a device for printing the image in accordance with the image data, wherein the above-mentioned processing device is able to transfer the image data as edited to both display device and printing device at the same time.

It is an object of the present invention to provide an image processing system for editing and displaying the read-out image and the coded image, wherein either the read-out image, or the coded image such as a pattern, sentence, graph, or a composed image produced by edition of both read-out and coded images is selected for transmission.

It is a further object of the present invention to provide an image processing system for processing and displaying images, wherein a plurality of image data input/output means are connected to the above-mentioned processing device, a plurality of stations which receive and send the image data into and out of the system through transmission lines, and the above-mentioned processing device is enabled to select any one of the input output means or any one of the stations.

It is still a further object of the present invention to provide an image processing system which is capable of readily editing color images.

BRIEF DESCRIPTION OF THE DRAWINGS

FIG. 7 is a schematic view showing the structure of the image signals;

FIG. 8 is a chart showing size bit signals MD;

DETAILED DESCRIPTION OF THE PREFERRED EMBODIMENTS

Now the present invention will be explained in detail by embodiments thereof shown in the attached drawings.

Figure 1:
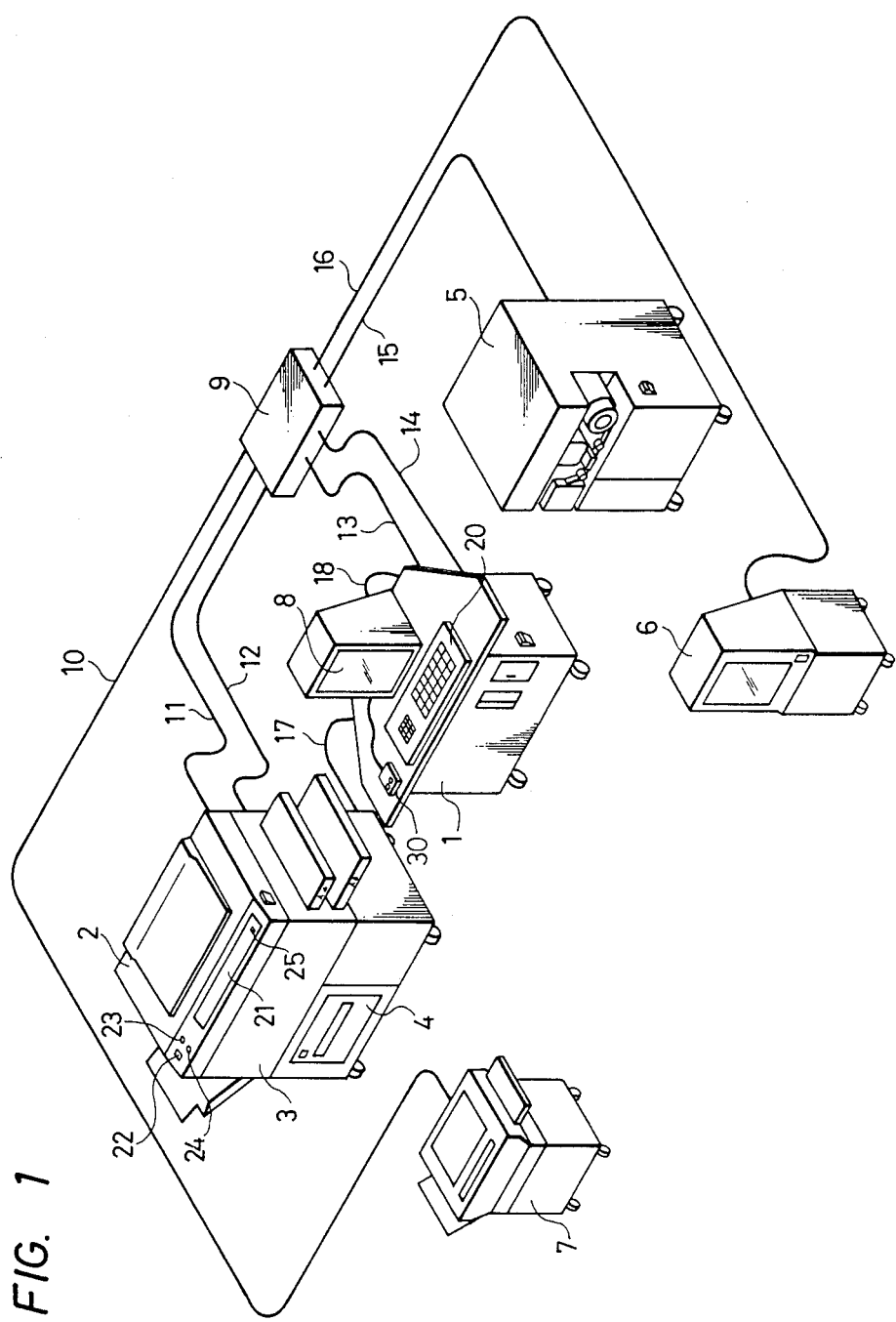
FIG. 1 is an external view of an image processing system embodying the present invention.

FIG. 1 is an external view of an image processing system embodying the present invention. A control unit 1, to be hereinafter called the work station, is composed of a microcomputer for system control, internal memories such as RAM, ROM etc., and external memories such as floppy disks or cartidge disks. Said work station 1 generates various commands for the system. Also it applies electrical processes such as translation, erasure, size modification etc. to the input image signals in response to the instruction of the operator, generates sentences from the characters and symbols entered by the operator through a keyboard to be explained later, and performs synthesis of an image and a text or of different images. When a color image scanner or a color printer is connected, color-processing of images and characters can be effected. An original reader 2 constitutes an input unit of a digital copier and converts the information of an original document placed on a document platen into electrical signals through an image sensor, such as a CCD, of ca. 5,000 bits. For this reader, there may be used a color scanner which reads an image by color-resolving using a plurality of color filters. A high-speed printer 3, composed, for example, of a laser beam printer and constituting an output unit of the digital copier, records an image on a recording material in response to the information in the form of electrical signals. For this printer, there may be used one capable of color-printing in accordance with input signals of the three primary colors. An image file 4 is equipped with a recording medium such as an optical disk or an opto-magnetic disk for recording and reading a large amount of image information. The image file is also capable of storing the colored images color-wise. The image file 4 may be designed to store the image information in a compressed form. A microfilm file 5 is equipped with a microfilm retrieval unit and a microfilm reader unit for converting the image information on a retrieved microfilm into electrical signals by means of an image sensor such as a CCD of ca. 3,600 bits. A high-resolution soft display unit 6 is provided with a photosensitive belt having a photoconductive layer on a transparent conductive substrate belt, and is capable of displaying an image by irradiating said photoconductive layer with a laser beam modulated according to the input image signals to form an electrostatic latent image on said photoconductive layer according to the pattern of the original image and rendering said latent image visible through development with conductive magnetic toner powder supported on a toner carrier. A printer unit 7 is composed, for example, of a laser beam printer similar to but smaller and slower than the printer unit 3, and is provided in case of the necessity for a back-up printer. A cathode ray tube unit 8 displays the image information photoelectrically read by the scanner unit of the digital copier and the microfilm file, and the control information of the system. A color display may be employed so as to be able to comply with the color processing. A switching unit 9 switches the connections of the input/output stations according to the signals from the control unit. Cables 10–18 electrically connect the input/output stations. A keyboard 20, provided on the control unit 1, is used for generating commands for the system and performs the function of a word processor or an office computer in combination with the cathode ray tube unit 8. A reference numeral 30 designates a point device for instructing the image information processing on CRT 8. By the operator shifting the point device 30, the cursor on CRT 8 is arbitrarily shifted in the X and Y directions to select a command image on the command menu for the required instructions. An operation panel 21 is used for controlling the function of the digital copier, and is provided with function keys for setting the copy number, copy magnification etc., a copy key 25 for instructing the start of the copying operation, a numeral indicator, etc. There are also provided a mode selecting switch 22 to be explained later, and display units 23, 24 composed of light-emitting diodes (LED's) for indicating the mode selected by the mode selecting switch 22. The above-described system may further contain other word processors, office computers, facsimile units, etc., or, depending on necessity, color readers and printers.

Figure 2:
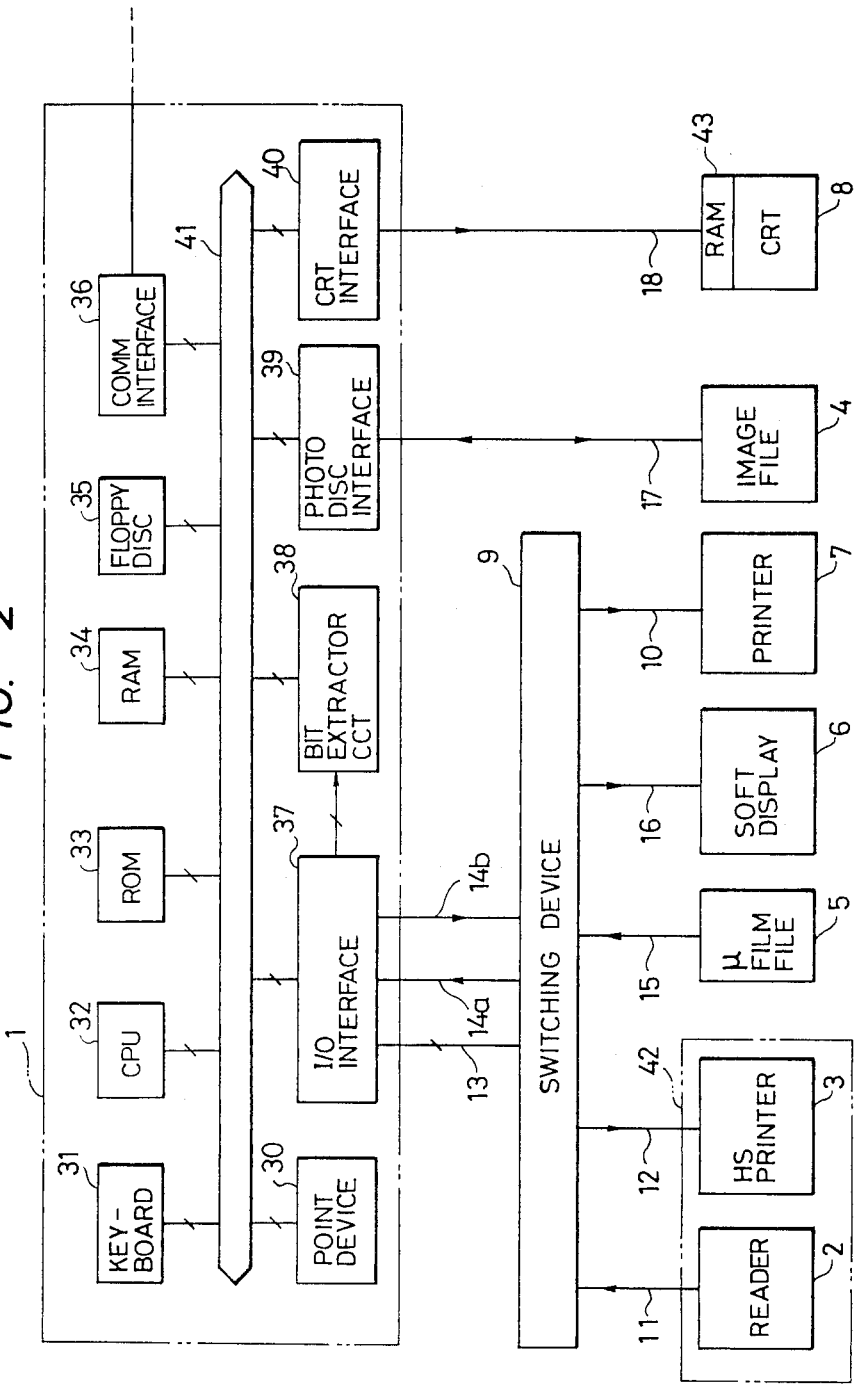
FIG. 2 is a block diagram showing the circuit structure of the image processing system.

FIG. 2 is a block diagram showing the circuit structure of the image processing system shown in FIG. 1, wherein blocks corresponding to those in FIG. 1 are represented by same numbers. In the control unit 1, there are provided a keyboard 31 corresponding to the keyboard 20 shown in FIG. 1 or the point device 30, which is used for entering commands to the system; a central processing unit (CPU) 32 composed of a microcomputer, for example the "68000" produced by Motorola; a read-only memory (ROM) 33 for storing a control program according to which the CPU 32 performs the control operation; a random access memory (RAM) 34 principally utilized as a working memory for the CPU 32 or a page memory for storing image signals transmitted between input/output units; an external memory 35 composed of a floppy disk for storing the control program of the system and the data base for image retrieval from the image file and microfilm file; a communication interface 36 for enabling information transmission with other work stations or other similar systems or terminals through communication channels such as a local area network or a digital facsimile line; an input/output interface 37 for information transmission between the control unit 1 and the switching unit 9; a bit extracting circuit 38 for extracting the bits of the image signals at a certain rate; an optical disk interface 39 for information transmission with the image file 4; a CRT interface 40 for information transmission with the CRT unit 8; a 16-bit bus 41 for signal transmission among various blocks in the control unit 1, said bus being also connectable directly with office machines such as the known word processor or office computer; and cables 10–18 electrically connecting the various input/output units for transmitting control signals and image signals, wherein the image signals flow as indicated by an arrow while the control signals flow bidirectionally. As will be apparent from the drawing, the original reader 2 and high-speed printer 3 of the digital copier 42, microfilm file 5, soft display unit 6 and small printer 7, respectively, are connected to the switching unit 9 through the cables 10, 11, 12, 15, and 16 and are connected to the input/output (I/O) interface 37 of the control unit 1 through the cables 13 and 14. Also the image file 4 and the CRT unit 8, respectively, are connected to the interfaces 39, 40 or the control unit 1 through the cables 17, 18. The CRT unit 8 is provided with a display RAM 43 for storing the image information to be displayed. The I/O interface 37 is provided with a serial-to-parallel register for receiving the image signals and a parallel-to-serial register for image signal output, since the switching unit 9 transmits the image signals in the form of serial signals while the bus 41 of the control unit 1 carries the information in the form of parallel signals. The parallel image signals are subjected to direct memory access (DMA) transmission on the bus 41.

The image signals released from the original reader 2 or the microfilm file 5 are supplied, in the unit of each line, to the I/O interface 37 of the control unit 1 through the switching unit 9. Said I/O interface 37 converts the image signals serially entered into 16-bit parallel signals. The signals thus converted are supplied through the bus 41, and stored, in the unit of each page, in an image area of the RAM 34. The signals thus stored in the RAM 34 are released again through the bus 41 for transmission to the exterior through the communication interface 36, for storage in the optical disk in the image file 4 through the optical disk interface 39, or for supply to the switching unit 9 through the I/O interface 37 for image formation selectively in the high-speed printer 3, soft display unit 6 or small printer 7.

On the other hand, the image signals read from the optical disk of the image 4 are first stored in the RAM 34, and then supplied selectively to the high-speed printer 3, soft display unit 6 or small printer 7 through the I/O interface 37 and the switching unit 9.

The image signals from the original reader 2 or the microfilm file 5 may be supplied from the switching unit 9 selectively to the high-speed printer 3, soft display unit 6 or small printer 7 without passing the control unit 1. Since the image file 4 or the CRT unit 8 is not required in a simple copying operation, the image signals for example from the original reader 2 are directly supplied to the high-speed printer 3 without passing through the control unit 1 to achieve a real-time copying operation. Such operation mode is called pass mode.

The control relating to the above-mentioned transmission of image signals is performed by the CPU 32 according to the commands entered by the operator through the keyboard 31 or the point device 30.

Figure 3:
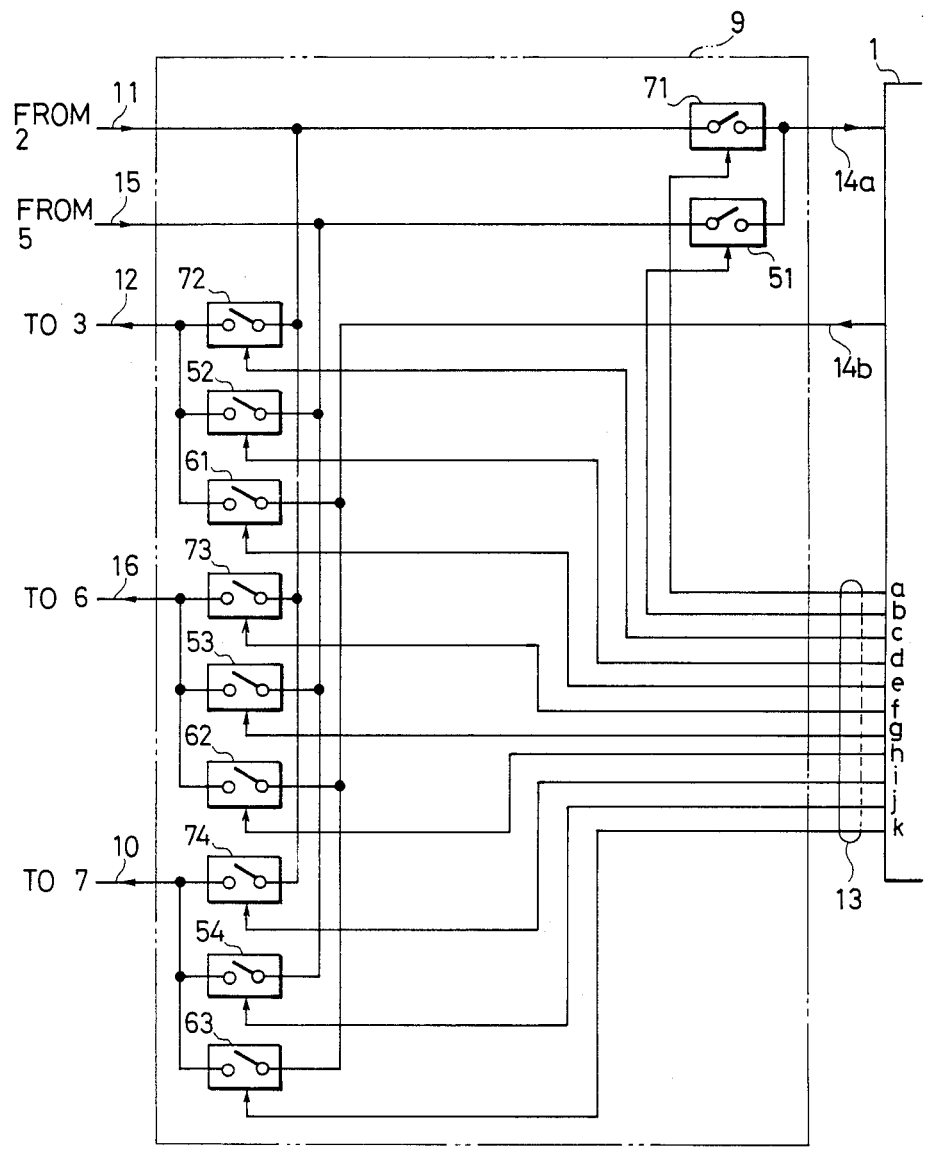
FIG. 3 is a circuit diagram of a switching unit.

FIG. 3 shows the detailed circuit structure of the switching unit 9, wherein the same cables as those in FIG. 2 are represented by the same numbers.

Figures 4, 5:
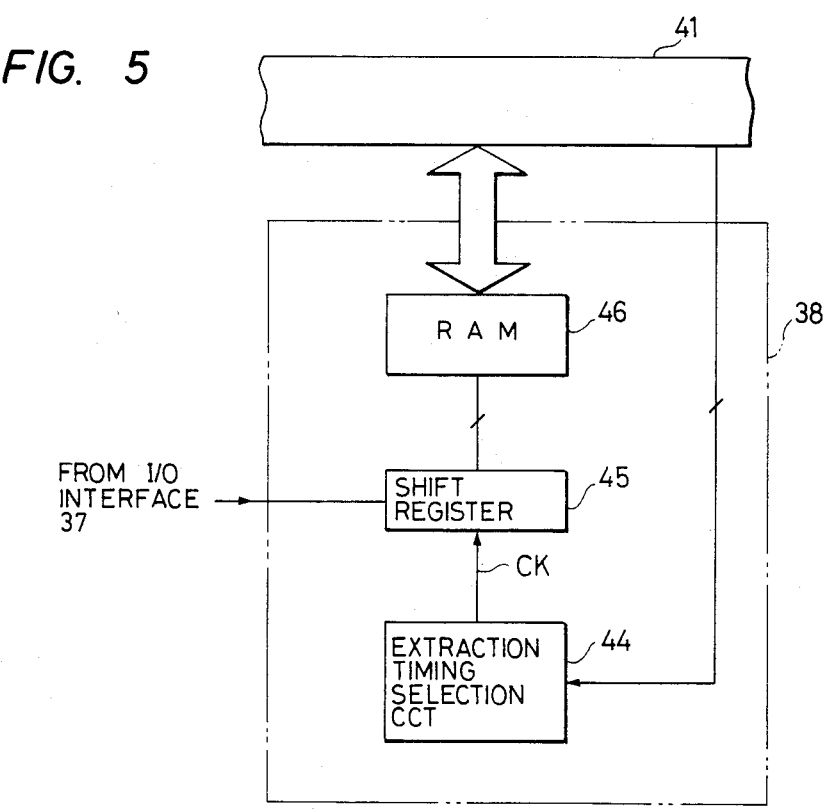
FIG. 4 is a chart showing the combinations of the switching operations.
FIG. 5 is a block diagram showing the circuit structure of a bit extracting circuit.

There are provided switches 51-54, 61-63 and 71-74 controlled by switching signals a-k transmitted from the control unit 1 through the cable 13. The switches 51-54 select the destination of the image signals released from the microfilm file 5 through the cable 15. The switches 61-63 select the destination of the image signals released from the control unit 1 through the cable 14b. The switches 71-74 select the destination of the image signals released from the original reader 2 through the cable 11. FIG. 4 shows the connection between the original reader 2, microfilm file 5 and control unit 1 for supplying the image signals and the high-speed printer 3, soft display unit 6, small printer 7 and control unit 1 for receiving the image signals, in relation to the function status of the switches 51-54, 61-63, 71-74, wherein the parenthesized figures indicate the numbers of the cables transmitting the image signals. Also, the indicated switch numbers indicate that the corresponding switches are closed. The switching unit 9 may also be composed of a logic circuit utilizing AND and OR gates.

In the following, there will be explained the function of the switching unit 9. As an example, in case switches 72, 53 and 63 are closed, there is achieved the function of a digital copier, in which the image signals from the original reader 2 are transmitted to the high-speed printer 3 through the switch 72. On the other hand, the image signals from the microfilm file 5 are transmitted to the soft display unit 6 through the switch 53, and the image signals from the control unit 1 are transmitted to the small printer 7 through the switch 63.

In this manner, selective control of the switches of the switching unit 9 allows arbitrary connection of the input/output units and enables the present system to effectively perform the functions of display, copy and data file. Also there is enabled simultaneous plural transmissions of image information to avoid the inconvenience of unavailability of other input/output devices during the transmission of image information between certain units. Furthermore, a high-speed process is rendered possible in the case of a simple copying or display operation, since the image signals from the originals reader 2 or the microfilm file 5 can be directly transmitted to the high-speed printer 3, soft display unit 6 or small printer 7 in the aforementioned pass mode, without the use of the control unit 1.

In the following, there will be explained the function when the CRT unit 8 displays the image signals released from the original reader 2 or the microfilm file 5. The present system employs a high-resolution cathode ray tube, capable of displaying information of ca. $6 \times 10^4$ bits. On the other hand, the original reader 2 can read originals up to A3 size, and an original reading of A4 size ($210 \times 297$) with a resolving power of 16 pel/mm provides information of $16 \times 210 \times 297 =$ ca. $10^6$ bits. The microfilm file 5 also provides image information of the similar magnitude. Consequently, the amount of information has to be compressed to about 1/16 when the image information from the original reader 2 or the microfilm file 5 is to be stored in the RAM 34 and displayed on the CRT unit 8. The bit extracting circuit 38 shown in FIG. 2 performs said compression as well as the image signal storage into the RAM 34.

FIG. 5 shows the structure of the bit extracting circuit 38, wherein shown are a bus 41 in the control unit 1; an extraction timing selection circuit 44 provided with a clock pulse generator which is composed of a crystal oscillator, a frequency divider, etc. and generates clock pulses CK according to a compression command from the CPU 32; a shift register 45 for sampling the image signals supplied from the I/O interface 37 in response to the clock pulses CK from said extraction timing selection circuit 44 and sequentially storing thus sampled image signals; and a RAM 46 for receiving signals from the shift register 45 when it is filled with the signals and supplying said compressed image signals to the bus 41 at determined timings. The I/O interface 37 supplied the image signals received from the switching unit 9 to said bit extracting circuit 38, simultaneously with the supply to the bus 41 for storage in the RAM 34. In this manner, the image signal compression for CRT display is performed simultaneously with the storage into the RAM 34 of the image signals supplied from the original reader 2 or the microfilm file 5. Consequently, the entered image signals can be immediately displayed on the CRT.

Figure 6:
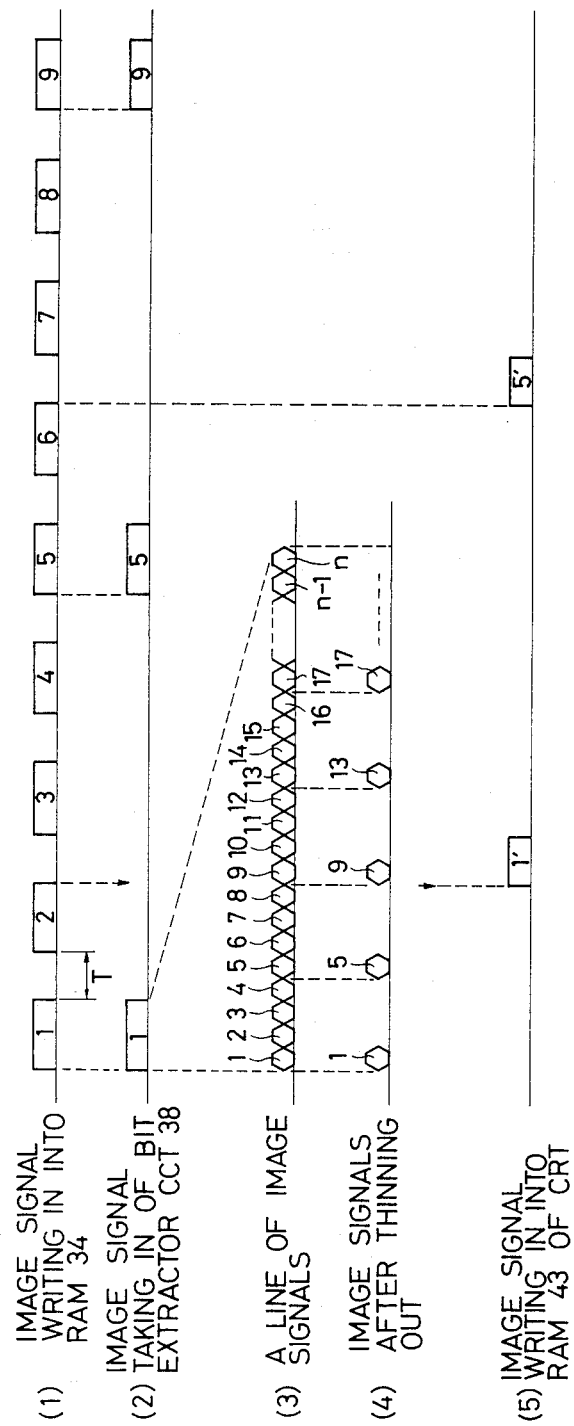
FIG. 6 is a timing chart showing the function of the bit extracting circuit.

FIG. 6 shows the function of the bit extracting circut 38. The switching unit 9 repeatedly releases the image signals in the unit of each line through the I/O interface 37 to the bus 41, for storage in the RAM 34. In FIG. 6, (1) indicates the timing of image signal storage into the RAM 34 through the I/O interface 37 and the bus 41, wherein numerals 1-9 indicate the numbers of image lines. It is to be noted that a blank time T exists between the release of image signals of a line and that of a succeeding line. The I/O interface 37 supplies the image signals entered from the switching unit 9 also to the bit extracting circuit 38, which performs the extraction of the image signals in the aforementioned manner in synchronization with the clock pulses CK from the extraction timing selection circuit 44. FIG. 6 shows a case of 1/16 compression of the image signals, in which the input image signals are extracted at a rate of one line out of four lines by selecting (4N+1)-th lines where N is 0 or a positive integer, and are further extracted at a rate of one dot per four dots from thus selected (4N+1)-th lines.

FIG. 6 (2) shows the extraction of the image signals at a rate of one line per four lines, and FIG. 6 (3) shows the image signals of one line thus extracted. Also FIG. 6 (4) shows the extraction of the image signals at a rate of one bit from every four bits. In FIGS. 6 (3) and (4) the numerals 1-n shown in the drawing indicate the numbers of bits.

The 1/16 compression of the image signals entered from the switching device 9 to the input/output interface 37 is achieved in this manner by extracting said image signals at a rate of one line per every four lines and by further extracting thus extracted image signals at a rate of one bit per every four bits.

The bit extracting circuit 38 temporarily stores the image signals after the compression into the RAM 46, and said signals are stored in the RAM 43 by DMA transmission through the bus 41 during the blank period T in the image signal transmission from the I/O interface 37 to the RAM 43. An efficient transmission through the bus 41 during the blank period T is rendered possible since the image signals 1', 5' after the compression is less in quantity than the image signals stored in the RAM 34. Consequently, the storage of the compressed image signals into the RAM 43 can be completed during the period of storage of the original uncompressed image signals into the RAM 34. The image signals after compression corresponding to a line need not be transmitted to the RAM 43 of the CRT unit within a blank time T but may be divided over several blank times. Also, the compressed image signals of plural lines may be transmitted within a blank time T.

The above-described function of the bit extracting circuit 38 is controlled by the CPU 32. Also the compression rate of the image signals is determined by the image size of the image signals released from the I/O interface 37. More specifically, in case of displaying the entire image over the display frame of the CRT 8, an effective display over the display frame of the CRT without defects is realized by determining the compression rate on the input image signals in response to the amount of the image signals corresponding to the displayed image. For this purpose, data indicating the image size are released at the release of the image signals from the original reader 2 or the microfilm file 5, and the CPU 32 calculates an optimum compression rate from said data to control the extraction timing selection circuit 44.

FIG. 7 shows the format of the image signals released from the original reader 2 or the microfilm file 5. In front of the image signals ID of a frame, there are provided size bit signals MD of 4 bits indicating the image size. The output interval between said size bit signals MD and the image signals ID is determined in response to the operating speed of the CPU 32. The size bit signals MD are set in response to the recognition of the frame size of the original or microfilm in the original reader 2 or the microfilm file 5, either through an automatic original detecting function or a manual size selection. The CPU 32 reads said size bit signals MD at the entry of the image signals, and controls the timings of the clock pulse generation in the extraction timing selection circuit 44, in order to achieve a compression corresponding to said size bits signals MD. FIG. 8 shows the image sizes indicated by the size bit signals MD employed in the present system and the corresponding compression rates R1-R8. The compression rates are determined according to the resolving power of the original reader 2, microfilm file 5 and CRT 8, and are stored in advance in the ROM 33. The command for executing the above-explained compression operation for the image signals is entered by the operator through the work station 1.

The input image signals can be monitored immediately since the signal compression for the CRT display is conducted simultaneously with the storage into the RAM 34, without compression of the image signals entered from the switching unit 9. Also the aforementioned bit extracting circuit 38 can be utilized for the compression of the image signals read from the image file 4.

Furthermore, the compression rate may be determined according to the source of the image signals, instead of the aforementioned determination in response to the size of the image.

In case of display on the CRT 8 of the image signals obtained from the original reader 2 or the microfilm file 5, the aforementioned signal compression is applied to the image signals of high resolution to accommodate the entire image on the CRT. On the other hand, the soft display unit 6 employed in the present system has a higher resolving power than that of the CRT. More specifically, said soft display unit 6 has an A3-sized display frame, with a resolving power of 16 pel/mm. Also, as explained before, the original reader 2 and the microfilm file 5 can read images with a resolving power of 16 pel/mm. Consequently, the obtained image signals can be monitored with the same resolving power as in the image reading by sending the image signals from the original reader 2 or the microfilm file 5 to the soft display unit 6 instead of the CRT 8.

The image size of the image signals from the original reader 2 or the microfilm file 5 may be smaller than A3 size, and, in such case, there will be formed a blank area in the display frame of the soft display unit 6. For achieving effective utilization of the display image area of the soft display unit 6, an enlargement is applied to the image information the size of which is smaller than A3 size.

Figure 9:
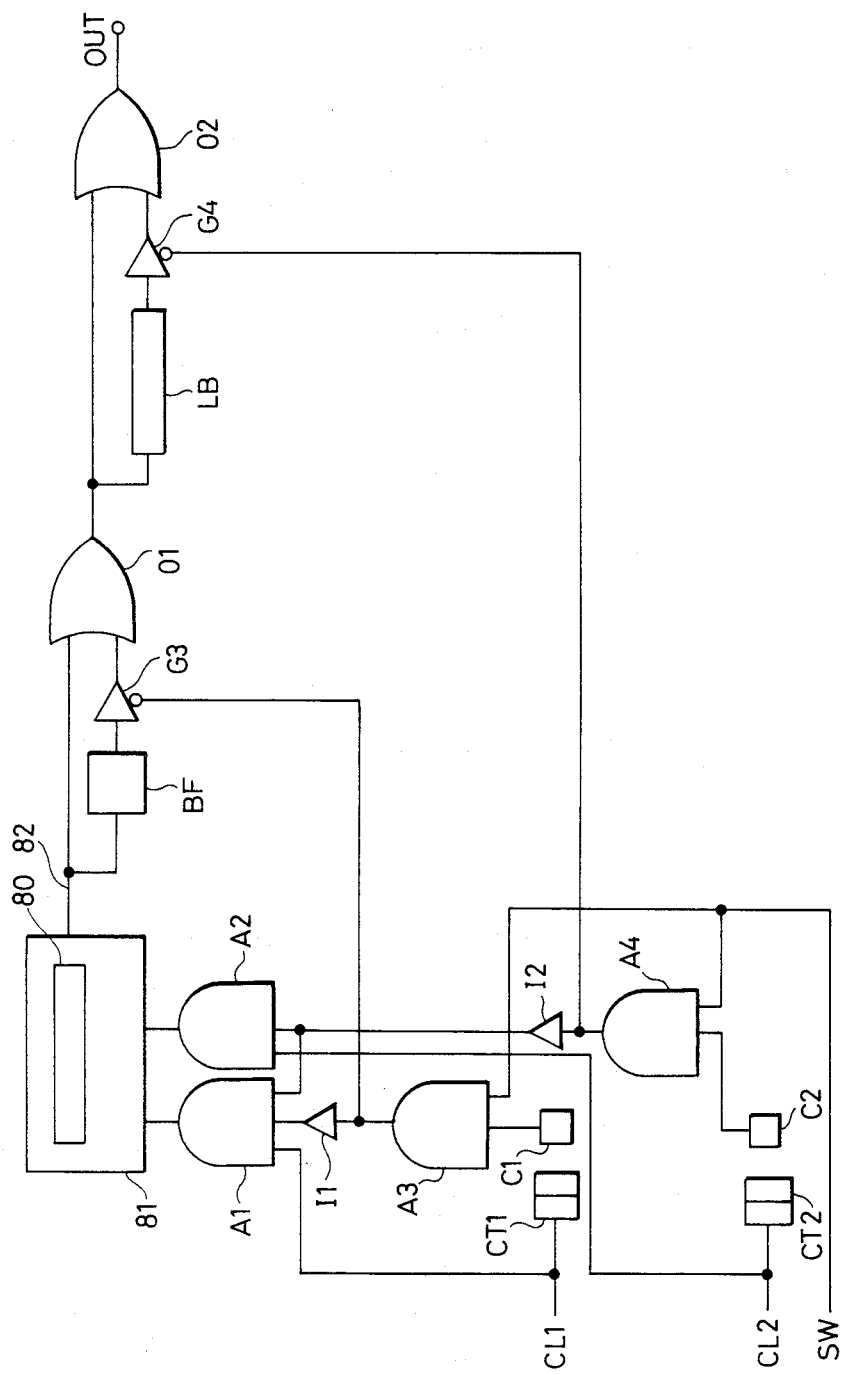
FIG. 9 is a block diagram showing an enlargement processing circuit.

FIG. 9 shows a circuit for enlargement of the image signals, which is provided in the original reader 2 and the microfilm file 5.

In FIG. 9, there are shown a linear sensor 80 composed of a CCD for reading an image; a driving circuit 81 for driving said linear sensor 80; a signal line 82 for releasing the signals read by said linear sensor 80 in synchronization with clock signals CL1; and line count clock signals CL2 for transferring the charges accumulated in the photodiodes of the linear sensor into a shift register of the driving circuit 81.

There are further shown 2-bit counters CT1, CT2, respectively, for counting the clock signals CL1 and CL2; detectors C1, C2 for respectively detecting the carry-over signals of said counters CT1, CT2; a switching signal SW for activating the enlargement circuit in response to the image size of the image signals; AND gates A1-A4; inverters I1, I2; OR gates O1, O2; gates G3, G4; a 1-bit buffer BF; and a line buffer LB.

The function of the above-described circuit is as follows. When the switching signal SW is at the low level, indicating that the enlargement process is unnecessary, the AND gates A3, A4 release low level signals, whereby the AND gates A1, A2 receive high level signals, respectively, through the inverters I1, I2 and through the inverter I2. Consequently the clock signals CL1, CL2 are supplied without change to the driving circuit 81 through said AND gates A1, A2 respectively. Also the gates G3, G4 are inactive, so that the serial image signals are released to an output terminal OUT in the unit of each line, in synchronization with said clock signals CL1, CL2.

On the other hand, when the switching signal SW is at the high level, indicating that the enlargement process is required, the AND gates A3, A4, respectively release the high-level signals when the detectors C1, C2 detect the carry-over signals. In response the inverters I1, I2 release low level signals, whereby the AND gates A1, A2 prohibit the transmission of the clock signals CL1, CL2 to the driving circuit 81.

Thus, when the detector C1 releases the carry-over detection signal, the clock signals CL1 are not supplied to the driving circuit 81, which, therefore, does not provide the image signals to the line 82. On the other hand, the gate G3 is opened to release the immediately preceding image signal stored in the 1-bit buffer BF through the OR gate O1. In this manner an image signal is released twice at a rate of one out of every 4 clock pulses, and the image signals are expanded 1.25 times in the line direction.

Also, when the detector C2 releases the carryover detection signal, neither the clock signals CL1 nor the clock signals CL2 are supplied to the driving circuit 81, which does not therefore release the image signals. On the other hand, the gate G4 is opened to release the image signals of an immediately preceding line stored in the line buffer LB through the OR gate O2. In this manner, the image signals of a line are repeated at a rate of one out of every four lines, whereby the image is expanded 1.25 times in the subsidiary scanning direction perpendicular to the line direction.

The aforementioned switching signal SW is released from the original reader 2, microfilm file 5 or control unit 1 to execute the enlarging process for example in response to the result of automatic size detection of the original placed on the original reader 2 indicating that the original size is smaller, e.g. A4 size, than the display area of the soft display unit 6, or in response to an enlarging command entered by the operator.

In this manner, the enlarged display on the soft display unit 6 through the enlargement process allows effective utilization of the display area thereof and facilitates the observation of the image by the operator. In the present embodiment there is only considered an enlargement of 1.25 times in both directions, but it is also possible to provide plural enlargement ratios to achieve an optimum enlarged display according to the original size. Also, the enlargement in the subsidiary scanning direction can be achieved by physically changing the subsidiary scanning speed of the linear sensor.

Also, the original size to be read by the original reader 2 may be larger than the display area of the soft display unit 6. In such case a reducing process may be applied to the image, thus displaying the entire image, without loss, on the display area of the soft display unit 6.

In the case of sending image signals obtained in the original reader 2 to the control unit 1 and storing said signals in the image file 4 equipped with the optical disk, the operation command for the scanner is entered through the keyboard 31 of the control unit 1. However, in case the original reader lacks an automatic original feeder when the images of plural pages are to be read or when handling bound originals, the operator is required to manipulate the original reader 2 and the control unit 1, alternately.

On the other hand, when storing the image signals obtained in the microfilm file 5 into the image file 4, it is not necessary to operate two units as explained above, since the microfilm file 5 of the present system is provided with a microfilm frame retrieving function which can be controlled through the keyboard of the control unit 1.

In order to avoid the above-mentioned drawback, the command for storing the image signals, obtained in the original reader 2 in the image file 4 can be entered from the original reader in the present system. As shown in FIG. 1, the original reader 2 is provided with an operation panel 21 for entering commands for performing the function of a digital copier, and said operation panel 21 is equipped with a copy key 25. The scanner operation in the original reader 2 for storing the image signals into the image file 4 can be started either by the control unit 1 or by the copy key 25, and the selection is made by the mode selection switch shown in FIG. 1.

Figure 10:
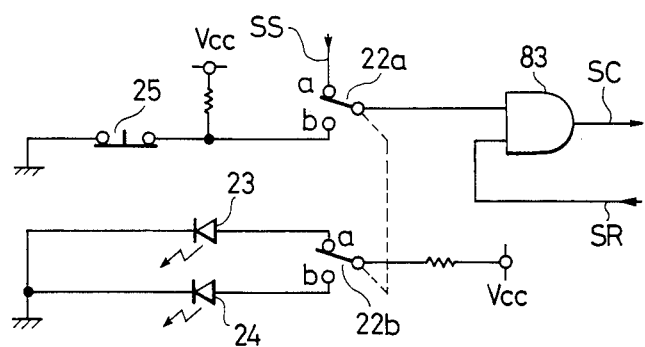
FIGS. 10 to 12 are circuit diagrams showing the structure of a switching circuit for the drive instruction mode of the original reader.

FIG. 10 shows a circuit for said selection, wherein linked switches 22a, 22b are shifted simultaneously by the switch 22. When the switch 22a is positioned at a contact (i), a scanner start signal SS from the control unit 1 is supplied from said contact (i) to an AND gate 83. If the original reader 2 is operable in this state, a scanner ready signal SR is supplied to said AND gate 83, whereby a scanner start command SC is supplied from the AND gate 83 to a not-shown control unit of the original reader 2. On the other hand, if the switch 22a is positioned at a contact (ii), the scanner start signal SS from the control unit 1 is not supplied to the AND gate 83. If the copy key 25 of the original reader 2 is depressed in this state, a high-level signal is supplied to the AND gate 83 in synchronization with said depression. The scanner start command SC is released if the aforementioned scanner ready signal SR is present in this state. Consequently, when the switch 22a is positioned at the contact (ii), the scanner start command SC can be generated by the actuation of the copy key 25 in the same manner as the scanner start signal SS from the control unit 1, thus initiating the original scanning.

The switch 22b linked with the switch 22a is shifted likewise to light a light-emitting diode 23 or 24 to indicate the adopted mode to the operator. Thus the operator can suitably select the mode of entry of command for starting the original reader from the lighting state of the LED's 23, 24.

Figure 11:
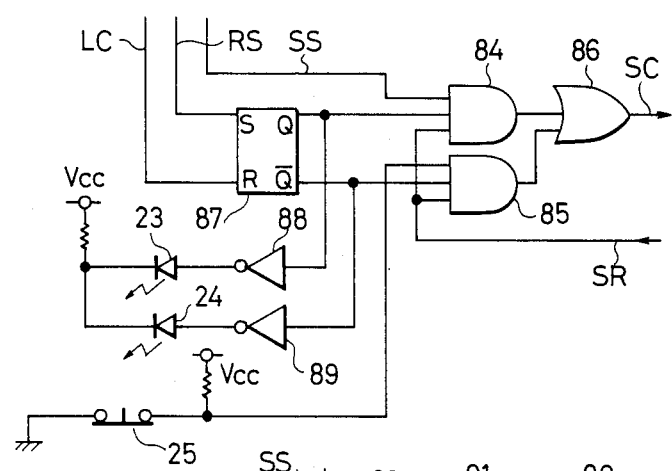

In FIG. 11, the circuit shown in FIG. 10 is composed of logic circuits. In the present circuit, the mode selection is made in the control unit 1. In case the original reader 2 is to be started by the control unit 1, a corresponding command is given by the keyboard 31 thereof, whereby a remote signal RS is supplied to a set terminal of a flip-flop 87 to set said flip-flop. Upon said setting, a high-level signal is supplied from a terminal Q to an AND gate 84. If the aforementioned scanner ready signal SR is supplied to the AND gate 84 upon entry of the scanner start signal SS from the control unit 1, the scanner start command SC is supplied through an OR gate 86 to the control unit of the original reader 2, thus initiating the original scanning.

On the other hand, in case the original reader 2 is to be started by the copy key 25 of the original reader 2, a corresponding command from the keyboard 31 shifts the remote signal RS to a low level state, while a local signal LS is shifted to a high level state. Thus the flip-flop 87 is reset whereby the output Q to the AND gate 84 is shifted to the low level while the output $\bar{Q}$ to the AND gate 85 is shifted to the high level. Upon depression of the copy key 25 in this state, a high-level signal is supplied to the AND gate 85, and, in the presence of the scanner ready signal SR, the scanner start command SC is released from the AND gate 85 through the OR gate 86. In this state, the scanner start signal SS from the control unit 1 is not transmitted to the OR gate 86 since the AND gate 84 is closed.

Also, an LED 23 or 24 is lighted according to the mode in the same manner as in the circuit shown in FIG. 10, thus indicating the adopted mode to the operator.

Figure 12:
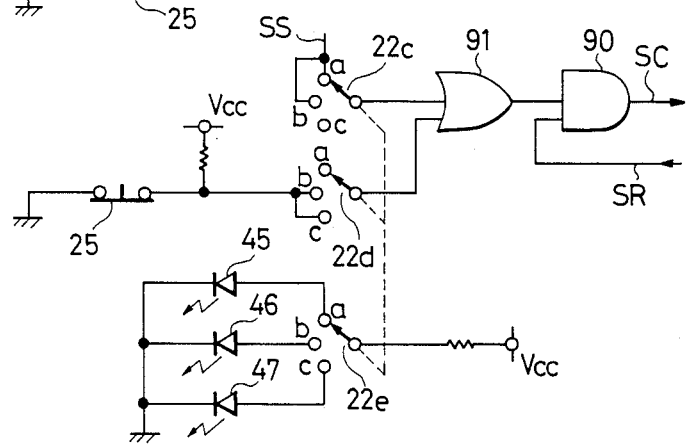

FIG. 12 shows still another embodiment in which the scanning operation of the original reader 2 can be initiated in three ways, either from the original reader 2, from the control unit 1, or from both. In this embodiment the mode selection switch 22 has three linked switches 22c, 22d, 22e. In case the switches 22c, 22d are positioned at contacts (ii), both the scanner start signal SS from the control unit and the signal generated from the copy key 25 can be transmitted to an AND gate 90 through an OR gate 91, so that, in this mode, the original reader can be started either from the control unit 1 or the original reader 2.

On the other hand, the original reader can be started from the control unit 1 alone if the switches 22c, 22d are positioned at contacts (i), or it can be started from the original reader 2 alone if said switches are positioned at contacts (iii).

In this manner the original reader 2 can be started either from the control unit 1 or from the original reader 2, so that the original reader 2 can be controlled from the same position as the original setting position.

FIGS. 13 (a)–(c) are flow charts showing the control procedure of the system described above. The program corresponding to said flow charts is stored in the ROM 33 of the control unit 1 and is read therefrom by the CPU 32 for performing the control operation.

Upon turning on the power supply to the control unit 1 of the present system, a step S1 clears the display face of the CRT unit 8, and a step S2 displays, on the CRT 8, a message awaiting the entry of a command into the command area of CRT in the work station, as will be described later, in preparation for the manipulation of the keyboard 31 or the point device 30 by the operator. Examples of the commands to be entered by the operator are an image input command for storing the image signals into the RAM 34 of the control unit 1, an image output command for reading the image signals from said RAM 34, and a pass mode command for image signal transmission bypassing the control unit 1.

A step S3 discriminates whether the image input command has been entered, and, if not, the program proceeds to a step S15 for discriminating whether the image output command has been entered.

In case the image input command has been entered, steps S4, S7 and S11 are executed to identify whether the image input is to be done from the microfilm file 5, original reader 2 or image file 4. If the microfilm file 5 is selected, the program proceeds from the step S4 to a step S5 to supply a drive command to the microfilm file 5, and to turn on the switch 51 of the switching unit 9, thus forming a path for transmitting the output image signals from the microfilm file 5 to the I/O interface 37. Then a step S6 searches, following the procedures shown in the flow chart of FIG. 13(f), a desired frame on the microfilm according to the retrieval data entered from the keyboard 31 while referring to the index stored in the floppy disk 35. A message is displayed indicating the desired frame is not found. However, if the desired frame is found, a step S9 discriminates whether there has been entered a command for displaying the image read from the microfilm onto the CRT 8, and, if not, the program proceeds to a step S14. On the other hand, if said command has been entered, the program proceeds to a step S10 to supply a start command to the bit extraction circuit 38 for compressing the image signals for display on the CRT, and the program then proceeds to the step S14.

When the original reader 2 is selected for image input, the program proceeds from the step S7 to a step S8 to supply a drive command to the original reader and to turn on the switch 71 of the switching unit 9, thus forming a path for transmitting the output image signals from the original reader 2 to the I/O interface 37. Then, a step S9 discriminates whether a command has been entered for CRT display, and the program proceeds to the step S14 in the absence of said command, or proceeds through the step S10 to the step S14 in the aforementioned manner in the presence of said command.

In case the image file 4 is selected for image input, the program proceeds from the step S11 to a step S12 to supply a drive command to the image file 4. Then a step S13 is executed, following the procedures shown in the flow chart of FIG. 13(f), to search the image information on the optical disk, according to the retrieval data entered by the operator and referring to the index stored in the floppy disk 35. The program further proceeds to the step S14 to supply the image input command to the selected image input unit to initiate the image unit operation and to store the obtained image signals of a page into the RAM 34.

When there is an instruction by way of the communication interface 36 to carry out the image input from another work station and reader through the transmission path such as local area net work, etc., the sequence proceeds from the step S43 to the step S44 where LIU of the communication interface 36 is set to be prepared for the image input from the transmission path. Then, the sequence proceeds to the step S14, and the image input operation is commenced in the same manner as mentioned in the foregoing.

Figure 13A:
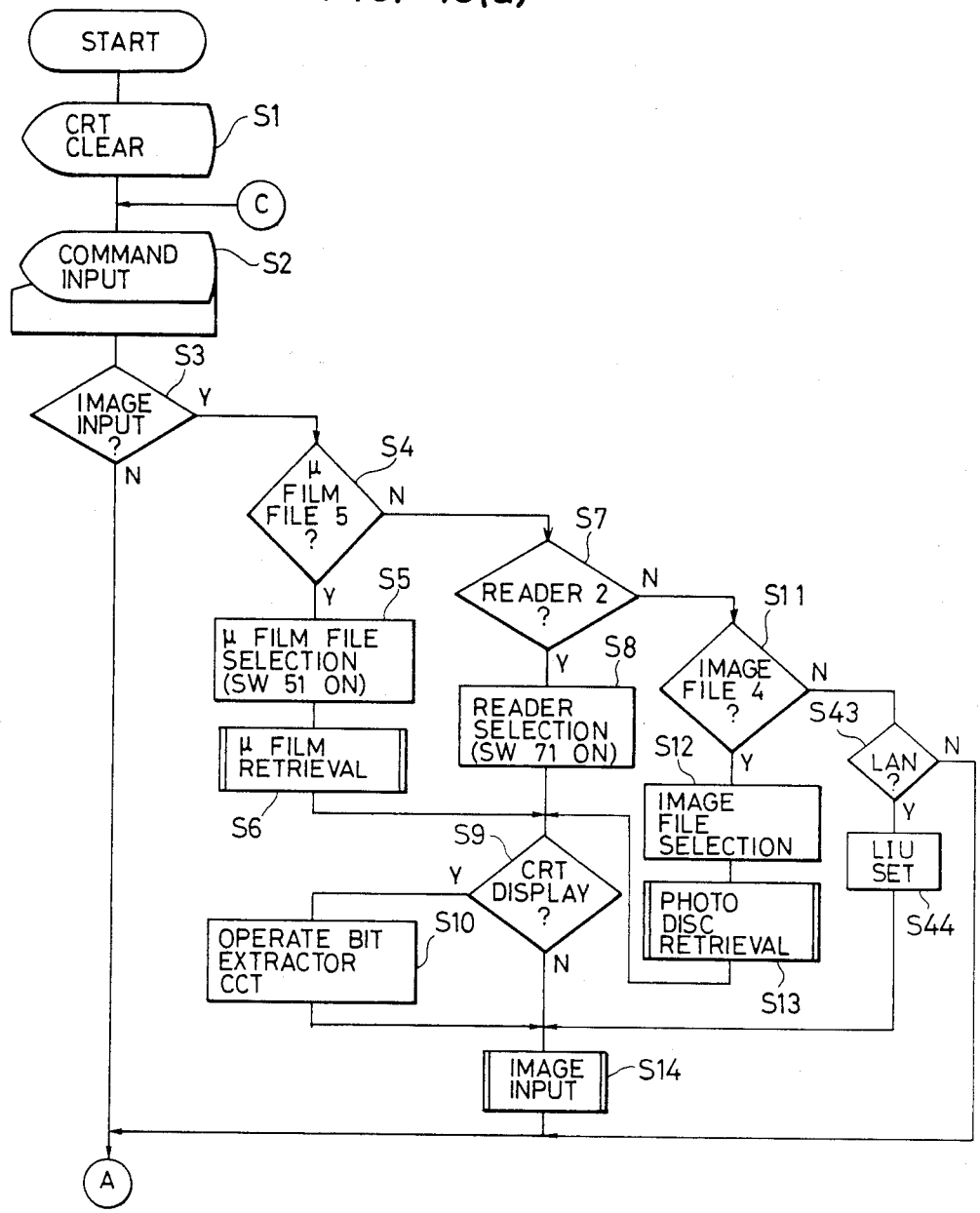
FIGS. 13(a) to (f) are flow charts showing the control program of the control unit.
Figure 13B:
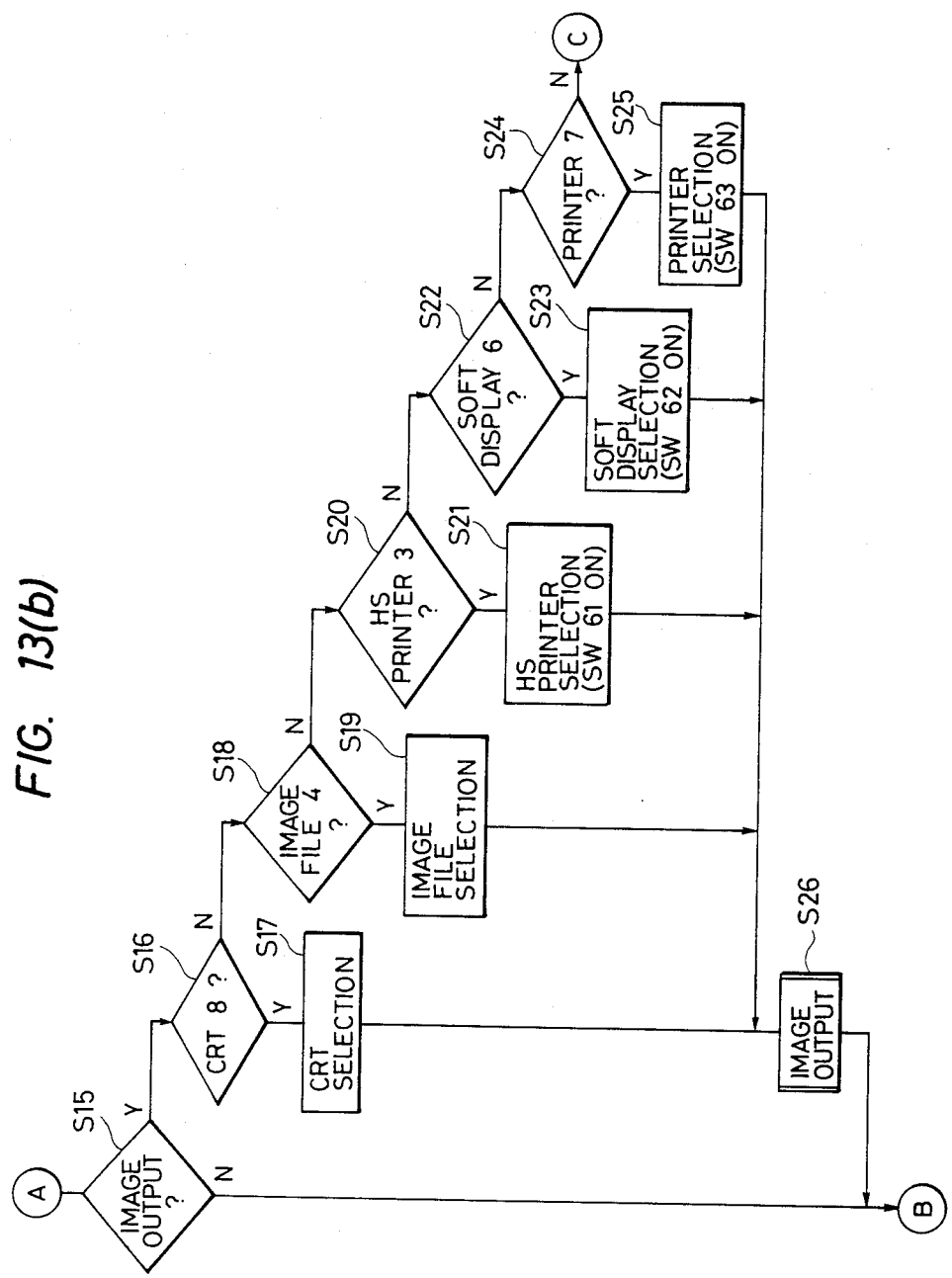
Figures 2, 13C:
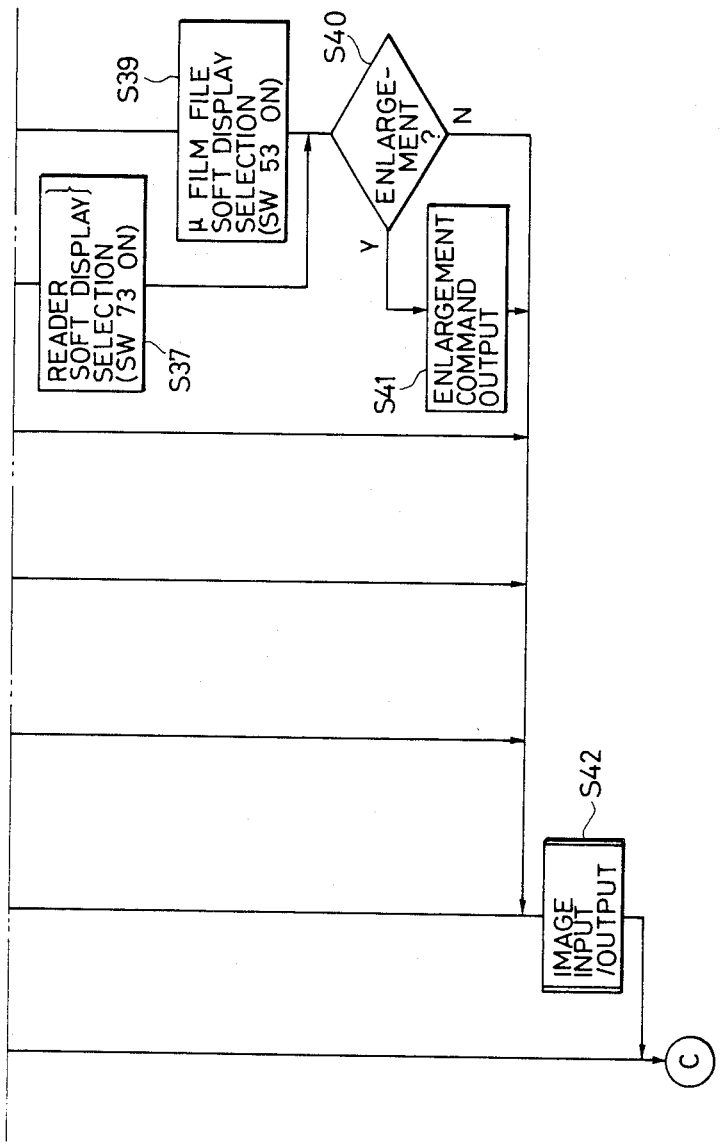
Figures 2, 13D:
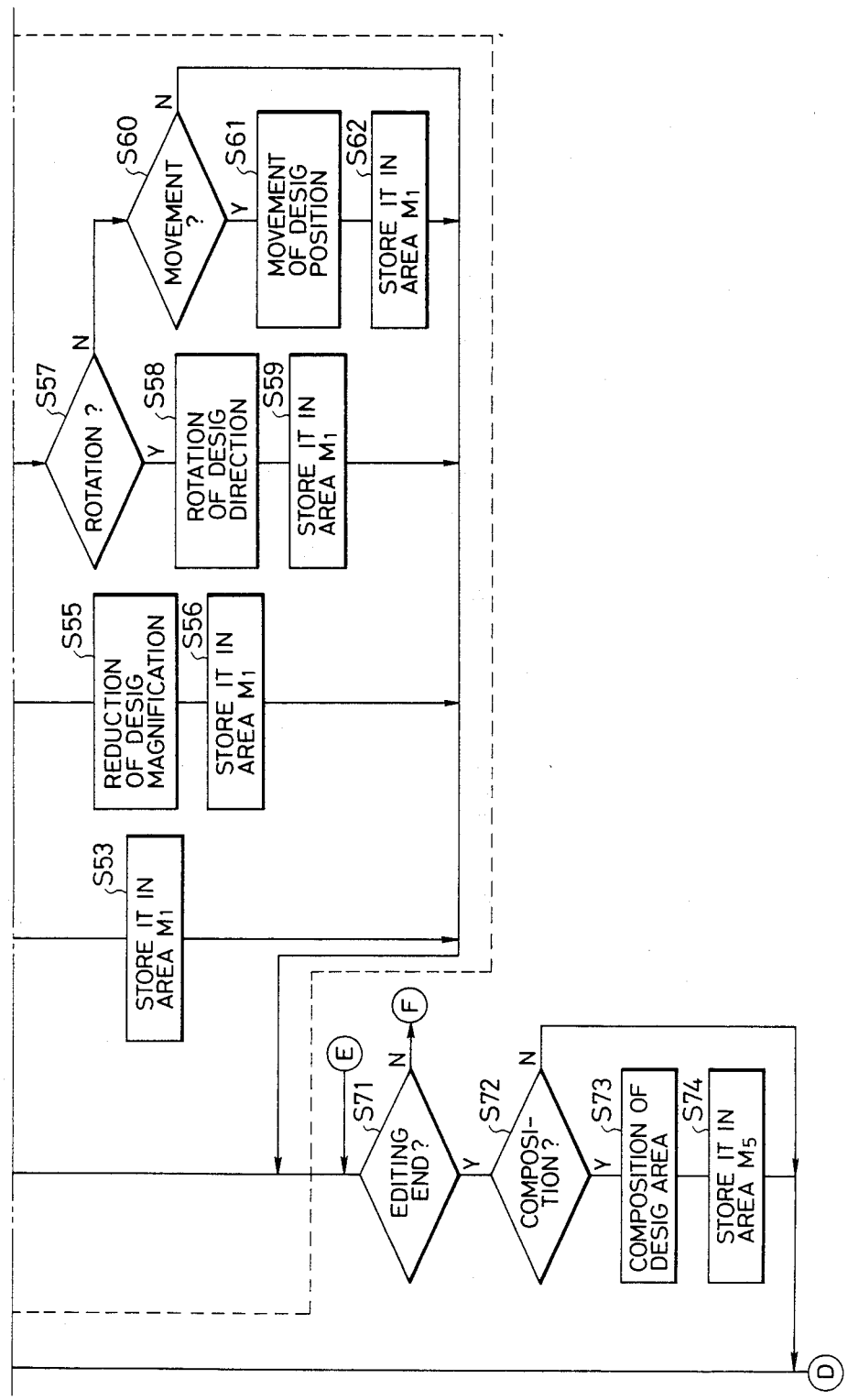
Figure 13E:
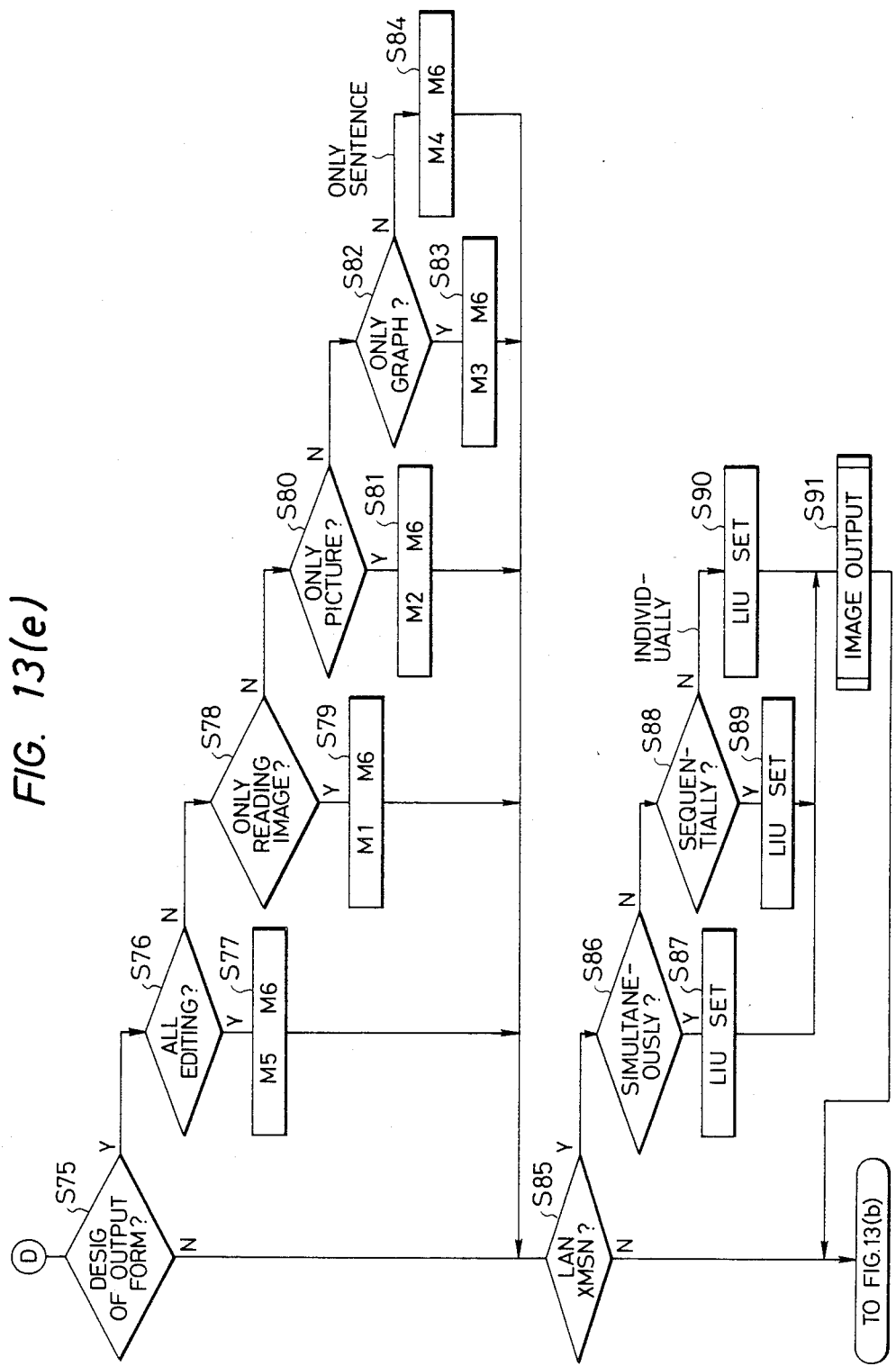
Figure 13F:
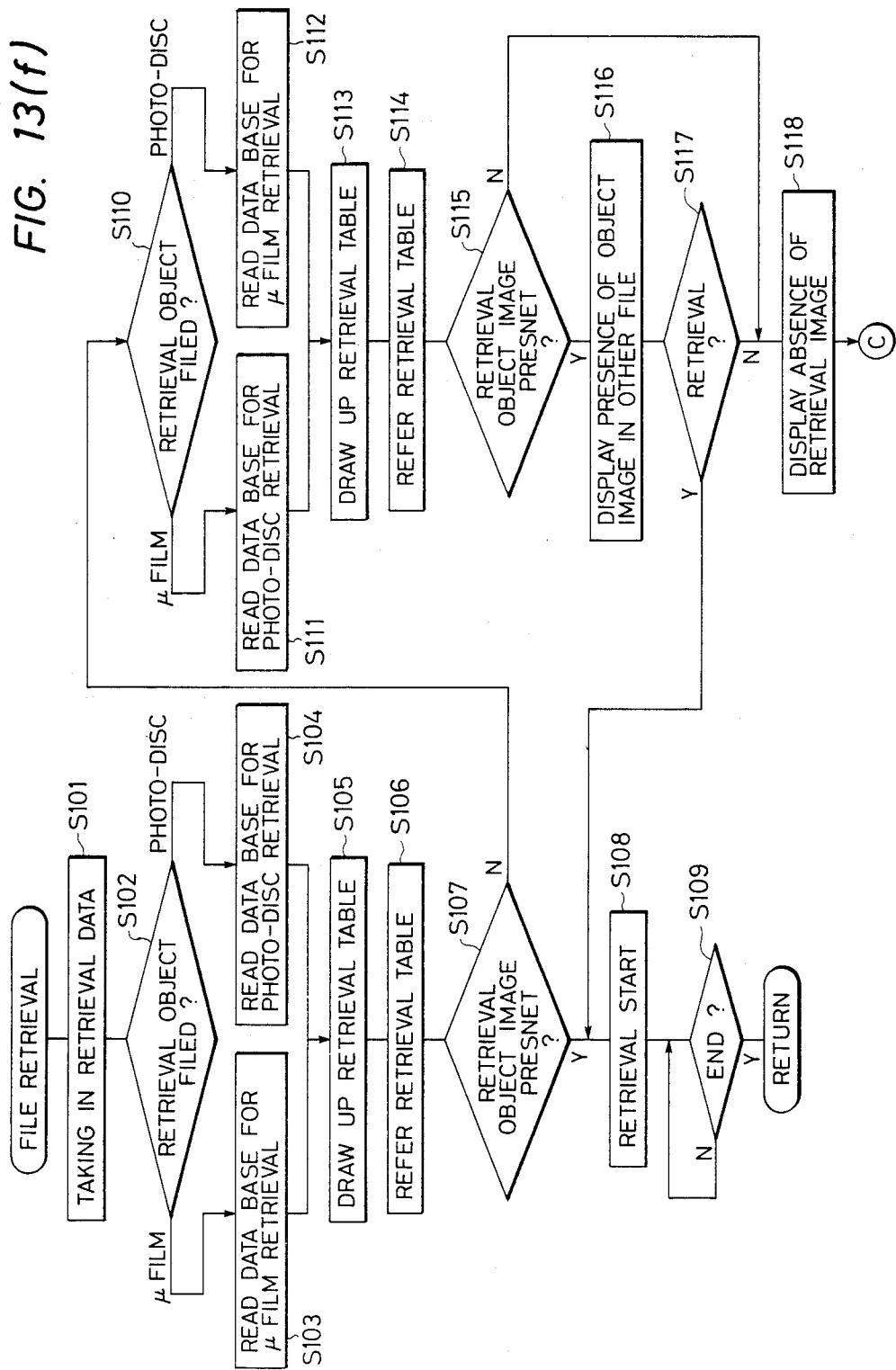

FIG. 13(f) is a flow chart showing file retrieving procedures to be executed at the steps S6 and S12 in FIG. 13(a). At the image information retrieval using either the microfilm file 5 or the image file (optical disc), the point device 30 or the keyboard 31 is used by the operator to effect input of information to specify a desired image such as, for example, file numbers, frame numbers, page numbers, dates, and so forth, depending on necessity.

At step S101, the retrieved data which have already been input by the operator for this image retrieval are taken in and are set in the retrieved data area in RAM 34. Then, the sequence proceeds to the step S102 where a judgement is made by the operator as to whether the file designated for the retrieval is the microfilm file 5 or the optical disc file 4. When the step S6 in FIG. 13(a) is designated, the microfilm file 5 is designated, whereas when step S13 is designated, the optical disc file 4 is designated. Therefore, in accordance with the designation, the sequence proceeds to either the step S103 or S104 where the data base for retrieving which corresponds to the file designated for the retrieval is selectively read by the floppy disk 35. In this manner, the control unit 1 prepares the retrieving table in RAM 34 at the step S105 on the basis of data base corresponding to any of the data files read by the floppy disc.

As soon as the retrieving table has been formulated in RAM 34, the sequence proceeds to the step S106 where the retrieving table is referred to in accordance with the retrieving table taken in at the step S101. Subsequently, at the step S107, a judgement is made as to whether or not the data corresponding to the desired image exist in the designated retrieving file. If the desired image is present in the designated retrieving file, the sequence proceeds to the step S108 where access to the microfilm file 5 or the optical disc file 4 is started. As soon as this retrieval terminates and the preparation for the image input is completed, the sequence proceeds from the step S109 to the step S9 in FIG. 13(a), skipping this retrieving program.

On the other hand, as the result of referring to the retrieving table at the step S106, if no desired image is present in the designated retrieving file, the sequence proceeds from the step S107 to the step S110. At the step S110, a judgement is again made by the operator as to whether the designated retrieving file is the microfilm file 5 or the optical disc file 4. If the designated retrieving file is the microfilm file 5, the sequence proceeds to the step S111, and, if the optical disc file 4, proceeds to the step S112. At the step S111, the data base for retrieving by the optical disc file is read in from the floppy disc 35. At the step S112, the data base for retrieving the microfilm file is read in from the floppy disc 35. In other words, at the steps S110 to S112, the retrieving data base in the file different from that initially designated by the operator for the retrieval is read in. For example, if the microfilm file 5 has been designated by the operator, the retrieving data base in the optical disc file is read in.

At the step S113, the retrieving table is formed in RAM 34 based on the data base read in at any of the step S111 or S112. Accordingly, at this instant, there is formed in RAM 34 a retrieving table corresponding to another file in place of the retrieving table corresponding to the file prepared at the step S105 and designated by the operator for the retrieval.

At the step S114, reference is made as to whether or not the desired image designated by the operator is present in the file, by use of the retrieving table prepared at the step S113. If the desired image is present in the file, the sequence proceeds to the step S116 where display is made on CRT as to absence of the desired image in the initially designated retrieving file, and its presence in another file.

Looking at this display, the operator gives an instruction as to whether or not the reading for retrieval of the images is to be done from other files different from the initially instructed retrieving file. That is, the operator gives the retrieval execution instruction if an image from another file will do, and gives the retrieval interruption instruction, if the image should be taken from the initially designated retrieving file.

This operator's instruction is judged at the step S117. If the instruction is for the retrieval execution instruction, the sequence proceeds to the step S108 where access is made to a file different from the initially instructed retrieving file and the image retrieval is started. On the other hand, if the retrieval interruption instruction has been given, the sequence proceeds to the step S118 where display is made on the CRT to the effect that the retrieving image is non-existent, and then the sequence proceeds to the step S2 in FIG. 13(a).

Incidentally, at the step S115, if it is judged that the desired image is not present even in a file different from the initially instructed retrieving file, the sequence proceeds to the step S118 where display is made to the effect that the retrieving image is non-existent to terminate the retrieving operation, after which the sequence proceeds to the step S2 in FIG. 13(a).

As stated in the foregoing, the file retrieving program is subjected to a judgement by the operator in accordance with the retrieving data base for the floppy disc as to whether or not the desired image is present in the initially instructed file. If the desired image is present therein, the retrieval output of the image is effected. On the other hand, if such desired image is not in existence, judgement is further made as to whether or not it is present in a file different from the initially instructed retrieving file. If it is present therein, the retrieval output of the image is effected in accordance with instruction of the operator. On the other hand, if the desired image is present in neither the instructed retrieving file nor other files, the display is made to that effect.

Accordingly, efficiency in the image retrieval can be improved in the apparatus provided with a plurality of files, whereby convenience in use by the operator becomes much improved. Incidentally, if it is found out that the desired image is not present in the initially instructed retrieving file but exists in another file, the retrieval in the other file may be commenced automatically without the operator's instruction.

After the completion of said image input operation, or in case the image input command has not been entered, a step S15 discriminates whether the image output command has been entered.

In the presence of said command, steps S16, S18, S20, S22 and S24 are executed to identify the unit selected for image output. In case the CRT 8 is selected for image output, the program proceeds from the step S16 to a step S17 to supply a drive command to the CRT 8 and the program further proceeds to a step S26. Where the image file 4 is selected, a drive command is supplied to the image file 4 to secure a storage area therein for the image signals, and the program proceeds to the step S26. If the high speed printer 3 is selected, the program proceeds from the step S20 to a step S21 to send a drive command to the high speed printer 3 thus initiating the preparatory operations such as laser activation, mirror rotation, sheet feeding etc. and to turn on the switch 61 of the switching unit 9 thus forming a signal path to the high speed printer 3, and the program then proceeds to the step S26. If the soft display unit 6 is selected, the program proceeds from the step S22 to a step S23 to activate said unit 6 for preparing for the image display and to turn on the switch 62 of the switching unit for forming a signal path, and the program proceeds to the step S26. On the other hand, if the small printer 7 is selected, a drive command is supplied to said small printer and the switch 63 of the switching unit is turned on to form a signal path to said printer 7, and the program then proceeds to the step S26.

The step S26 releases the image signals stored in the RAM 34 to the output unit selected and prepared in the above-described manner to cause the image recording or image display. If the image from the microfilm file 5 or original reader 2 is to be displayed on the CRT 8, the display operation is conducted according to the display data already stored in the RAM 43 of the CRT 8.

It is also possible to simultaneously select plural different output units and to send the same image signals to said output units simultaneously or in succession to execute displays and/or recordings of a same image at plural locations.

A step S27 discriminates whether there has been selected the pass mode for image signal transmission without passing through the control unit 1. If said pass mode has been selected, steps S28, S30, S32, S34, S36 and S38 are executed to identify the combination of input/output units to be employed in said pass mode. If a combination of the original reader 2 and the high speed printer 3 is selected, the program proceeds from the step S28 to a step S29 to send drive commands to both units and to turn on the switch 72 of the switching unit 9, thus forming a signal path from the original reader 2 to the high speed printer 3. If a combination of the microfilm file 5 and the high speed printer 3 is selected, the program proceeds from the step S30 to a step S31 to send drive commands to both units and to turn on the switch 52 of the switching unit 9, thus forming a signal path from the microfilm file 5 to the high speed printer 3. If a combination of the original reader 2 and the small printer 7 is selected, the program proceeds from the step S32 to a step S33 to send drive commands to both units and to turn on the switch 74 of the switching unit 9, thus forming a signal path from the original reader 2 to the small printer 7. If a combination of the microfilm file 5 and the small printer 7 is selected, the program proceeds from the step S34 to a step S35 to send drive commands to both units and to turn on the switch 54 of the switching unit 9 for forming a signal path between said units. If a combination of the original reader 2 and the soft display unit 6 is selected, the program proceeds from the step S36 to a step S37 to send drive commands to both units and to turn on the switch 73 of the switching unit 9 for forming a signal path from the original reader 2 to the soft display unit 6, and a step S40 is executed to discriminate if an enlarged display is required. If such enlarged display is required, the program proceeds to a step S41 to send a switching signal SW to the enlargement process circuit shown in FIG. 9. If a combination of the microfilm file 5 and the soft display unit 6 is selected, the program proceeds from the step S38 to a step S39 to send drive commands to both units and to turn on the switch 53 of the switching unit 9, thus forming a signal path between said units. Subsequently, the program proceeds to the step S40 to identify the requirement for the enlarged display as explained before, and, if required, the step S41 activates the enlargement process circuit.

Upon preparation of the units selected in the pass mode in the above-described manner, a step S42 causes the selected input unit to initiate the image input and the selected output unit to initiate the image output.

Also as explained before, the present system is capable of simultaneous plural transmissions of different image signals, for example the transmission of image signals in the pass mode from the original reader 2 to the smaller printer 7 under the control of the control unit 1 during the signal reception from the microfilm file 5 to the control unit 1.

As explained in the foregoing, the operation control and drive control of the present system are conducted by the CPU 32 according to the commands entered by the operator through the keyboard 31 or the point device 30 of the control unit 1. The present system allows connection of various image input/output devices, thus enabling efficient utilization thereof and achieving improved work efficiency and speedier image processing. Naturally, the species and number of the input/output devices constituting the system may be suitably selected according to the mode of utilization. If color image processing is required, a connection is made between the system and a device to achieve such color image processing.

Figure 15:
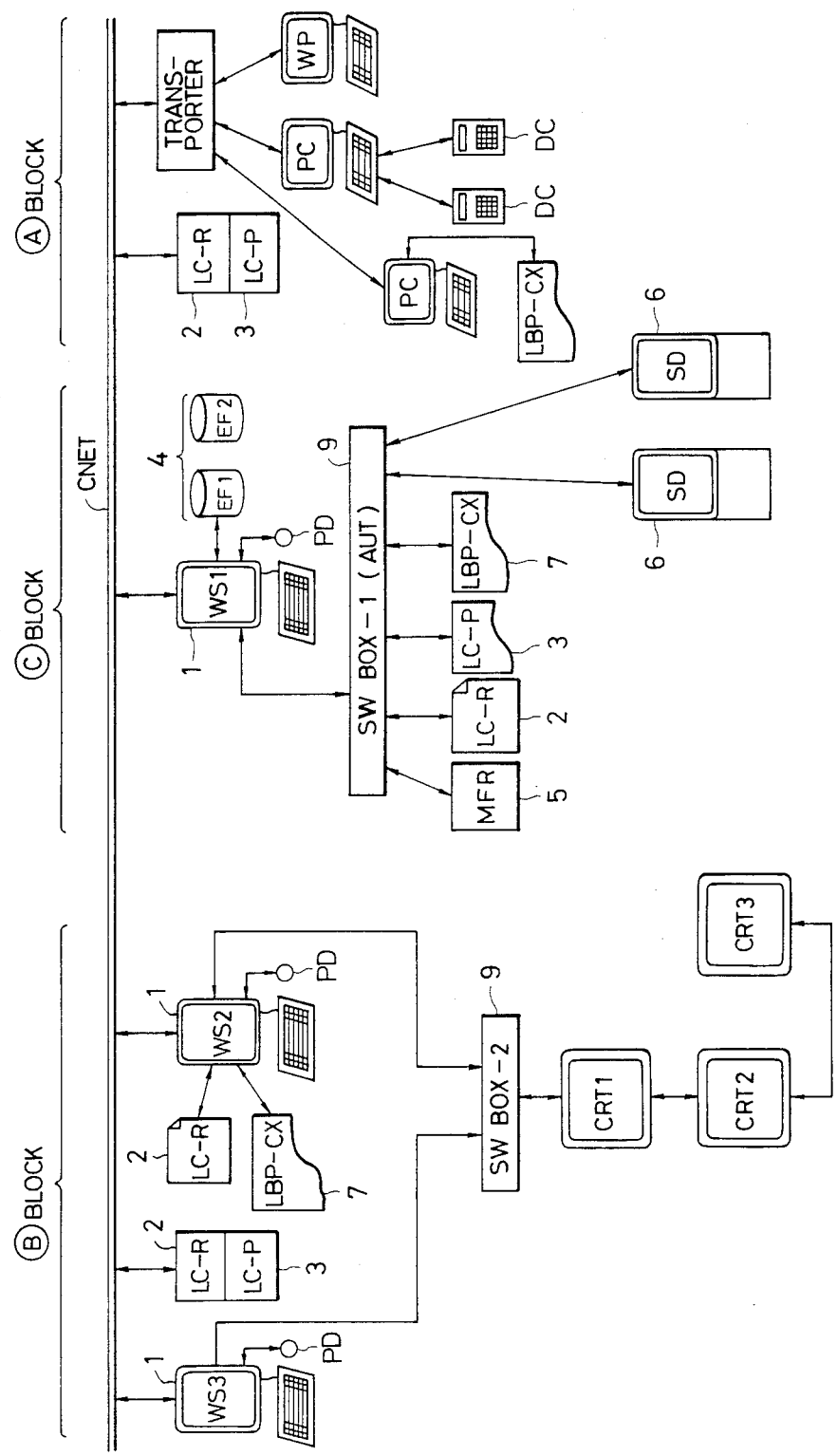
FIG. 15 is a schematic diagram showing the construction of the network.

In the following, explanations will be made in reference to FIG. 15 as to an example of transmitting image signals to another station through the network and an example of the image editing. It should be noted that the block Ⓒ in FIG. 15 corresponds to that shown in Figure.

The function of the work station WS1 is as follows. WS1 is able to introduce as an input into it an image read from the reader 2 and the microfilm file 5; an image retrieved and output from the optical disc file 4; images from another WS2 and WS3 which have been transmitted and input thereinto through the local network CNET and the communication interface 36; images from the high speed readers in the blocks Ⓐ and Ⓑ, which have been transmitted and input thereinto in the same manner through the communication interface 36; and code images from the word processor WP and personal computer PC in the block Ⓐ such as, for example, patterns, graphs, sentences, etc., which have been transmitted and input thereinto through the communication interface 36. It is also possible, as a matter of course, to process those coded images such as patterns, graphs, sentences, etc. prepared by the keyboard, etc. of the work station WS1. Thus, WS1 is able to edit one or more of these images in combination, and to display the same on CRT8. It is further possible to input the video-image signals taken by the video-camera. Further, the edited image can be printed by the printers 3 and 7, stored in the optical disc file 4, and monitored by the soft display 6. Furthermore, such an edited image can be transmitted to another WS2 display and WS3 printer through CNET constituting the local area network LAN for the purpose of display and printing. The editing work includes cutting of a desired portion of an image displayed on the CRT 8, enlargement and reduction of such cut-out portion, and rotation, shifting, etc. thereof. This editing work can also be effected on the input color image. It is also possible to effect synthesis of the above-mentioned coded image and the read-out image, or synthesis of these edited images. Such editing function and other functions to be mentioned later are performed by the operator following the operations of the point device 30 or the keyboard 31.

For this purpose, the work station WS designates the station of the network or a connecting device, thereby being able to exchange the data between them. The designation is effected separately from designation of the input/output device shown in FIG. 1. Moreover, WS makes it possible to effect selection of images to be transmitted and selection of the addresses where such selected images are forwarded. It can also designate the type of transmission of the image by picture element data such as read-out data, etc., and the image by coded data such as sentences, patterns, or other images, so that they may be conveniently transmitted for their own purpose.

Moreover, the principal memory device in WS (the memory 34 shown in FIG. 2, in the main) is to distinguish and store therein the above-described read-out image, transmission image, and edited image. It functions to output these image data to each of the output devices of that work station, or to transmit such image data to WS2 and WS3 by means of CNET. Further, this main memory device 34 develops a part of the image data thereof in the memory 43 of CRT 8 as the picture element data, and displays on the CRT the input/transmitted images and the edited images. Incidentally, other work stations WS2 and WS3 possess, in like manner, the display function by CRT, the transmission function, the image editing function, the transmission address selecting function, and the image selecting function, and the command function by a cursor using the point device 30 on CRT. Furthermore, with WS1 or the image reader as the starting point, the image data can be transmitted simultaneously to all of a plurality of work stations WS2, WS3, and the printers, or to some of them selectively (simultaneous transmission). At the same time, monitoring and printing of the image data at other stations become possible.

The command designation function using the point device 30 is termed 'local command function'. This local command function is such that an arrow mark image (cursor) of a few millimeters or so is displayed on CRT of the work station, and then, by shifting the cursor in any of the X and Y directions through arbitrary manual operation of the point device PD, the command image which has been displayed beforehand on CRT is designated to thereby select the command. With this local command function, the selection of the command can be done easily and quickly in comparison with the command selection by the key input, and so forth.

Figure 14A:
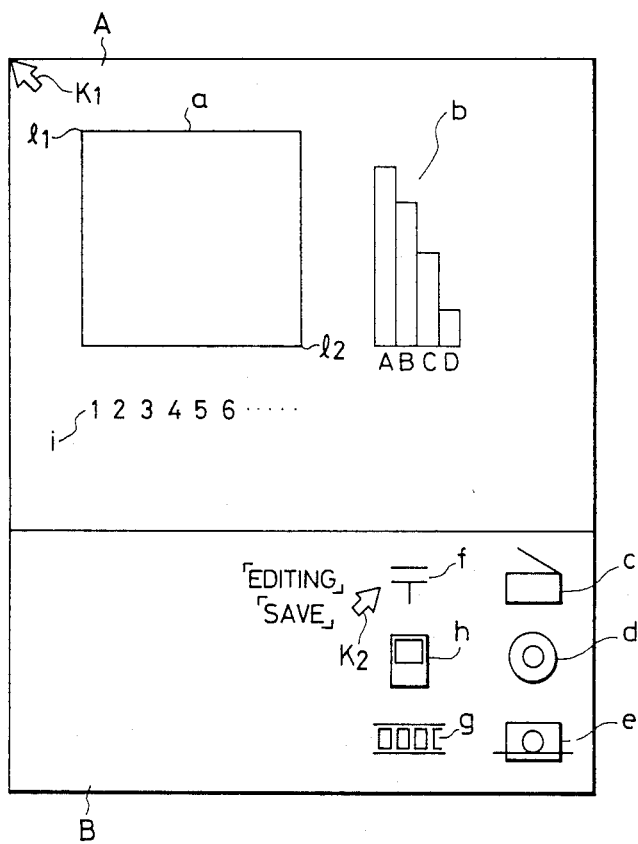
FIGS. 14(a) to (d) are diagrams showing the display surfaces at the work stations WS.

The command image is displayed, for example, at a command area B on the display surface of CRT as shown in FIG. 14(a). The reader 2, the image file, the microfilm reader 5, the printer 3, and the soft display 6 are respectively displayed in picture as c, d, g, e, and h. The local area network CNET is displayed as a post office mark (as used in Japan) designated as f. By shifting the point device PD on the desired image which is displayed at the command area B of CRT, the command image is designated with use of the cursor k2. When the switch on the point device PD is turned on, its address data are stored. The cursor k2 shifts within the command area B alone, while the cursor k1 moves within the command area A alone. The cursor k1 designates the cutting position and the shifting position of the image. Both cursors k1 and k2 are selected by changing over the switch on the point device PD. Incidentally, it is possible to execute the designation operation on both command areas A and B by means of a common cursor without providing the cursors k1 and k2 separately.

Besides the above-mentioned picture display at the command area B of CRT, there is also displayed in the form of characters the editing command to be used at the time of the editing. Also, in the vacant area at the left side of the command area, a table to be mentioned later may be displayed depending on necessity.

As an example of command by the cursor, when the command cursor k1 is placed at a position in FIG. 14(a), the command cursor k2 is placed on the reader mark c, and the switch on the point device PD is turned on, the work station WS is brought to a state of receiving the read-out image from the reader 2. When the image data from the reader 2 are input into the work station WS, they are stored in the principal memory 34, and, at the same time, the image is automatically displayed on the full surface of the area A on CRT. In the next place, when the switch of the command cursor k1 is turned on at this position, followed by placing the cursor k2 on the printer mark e and turning-on of the switch thereof, the command is given to the effect that the image on the command area B is output to the printer 3, whereby the picture element data are output from the principal memory to the printer 3, as has already been described in the foregoing. Further, when the command cursor k2 is positioned on the mark d and the switch is turned on, the picture element data of the principal memory are registered in the image file 1. Furthermore, when the cursor k2 is placed on the reader mark h and the switch is turned on, an image corresponding to the image data in the principal memory is displayed on the soft display 6.

As the second example of the command, when the command cursor k2 is placed on the film mark g and the switch is turned on, a retrieving command table of the film is displayed on the left side of the command area B. When a desired film file number or frame number is designated out of the retrieving command table by means of the cursor k2 or the keyboard, the retrieving data are set in the memory which is incorporated in CPU 32. Subsequently, when the command cursor k1 is again placed at the position g in FIG. 14(a), and the switch of the point device PD is turned on, the film retrieval is commenced. After completion of the retrieval, the film frame is read out automatically and the data are forwarded to the principal memory of the work station WS, while CRT 8 displays the read-out image on the full surface of the command area A. Then, the image is stored in the image file 1, and the output to the printer 3 and the soft display 6 is done in the same manner as mentioned in the foregoing.

As the third example of the command, when the command cursor k2 is placed on the post office mark f, and then the switch is turned on, a table containing each station number connected to the network CNET is displayed in the left side of the command B. When the station number of the desired work stations WS2, WS3, and the reader printers is designated by the command cursor k2, data for selecting the station number is set in the memory. This station number can be set in plural. After setting of the station number or upon designation of the "simultaneous broadcasting" in the table by means of the command cursor k2 without setting the station number, if the station number has already been selected, those images on CRT 8 of the work station WS1, which are desired to be transmitted, are simultaneously transmitted through the network CNET to all of the selected stations; if no selection of the station number has been done, such images are simultaneously transmitted to all of the stations connected to the network CNET. Incidentally, those images which are desired to be transmitted are selected by the cursor subsequent to selection of the station and prior to instructing the "simultaneous broadcasting". The selection is determined by designating a coordinate in the command area A by means of the cursor k1. When at the position of the cursor k1 in FIG. 14(a), the entire command area A is transmitted. If the coordinate $l_1 \rightarrow l_2$ is designated, only the image within a square region a defined by $l_1$ and $l_2$ as the diagonal vertexes. Incidentally, when a plurality of station numbers are sequentially designated to the addresser, and the switch of the point device PD is turned on, one and the same image can be sequentially transmitted to each of the stations through the network CNET (sequential broadcasting). Each of the work stations WS2, WS3, to which the image data have been transmitted, displays and prints the same image as that of the work station WS1. At the printer station, the print output is effected simultaneously with the transmission or subsequent to the image data having once been written in the memory. If the image to be transmitted by use of the network CNET is the read-out image, the transmission is done in utilization of image data transmission lines; and if the image to be transmitted by use of the network CNET is coded data such as sentences, graphs, patterns or the like, the transmission is effected in utilization of the packet transmission lines. Incidentally, the packet lines are separately provided from the image element lines so as to enable required control data such as protocol, etc. to be forwarded at the time of the image element data transmission. Selection of the address station, transmission line, and so on is done by the transmission control unit (LIU) provided at the communication interface 36. It should be noted in this connection that both image element data and the coded data may be transmitted on one and the same line by means of the time-division, etc.

Figure 14B:
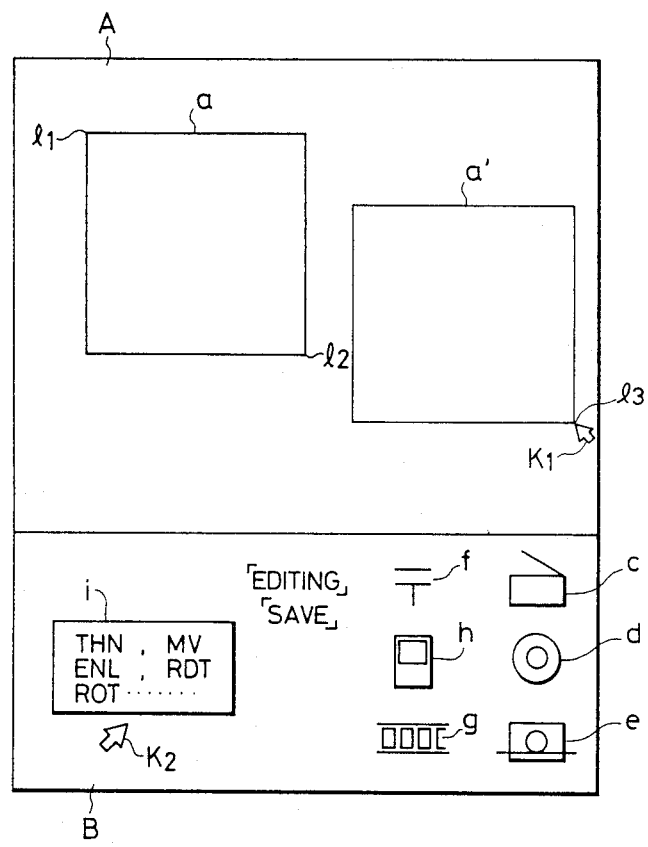
Figure 14C:
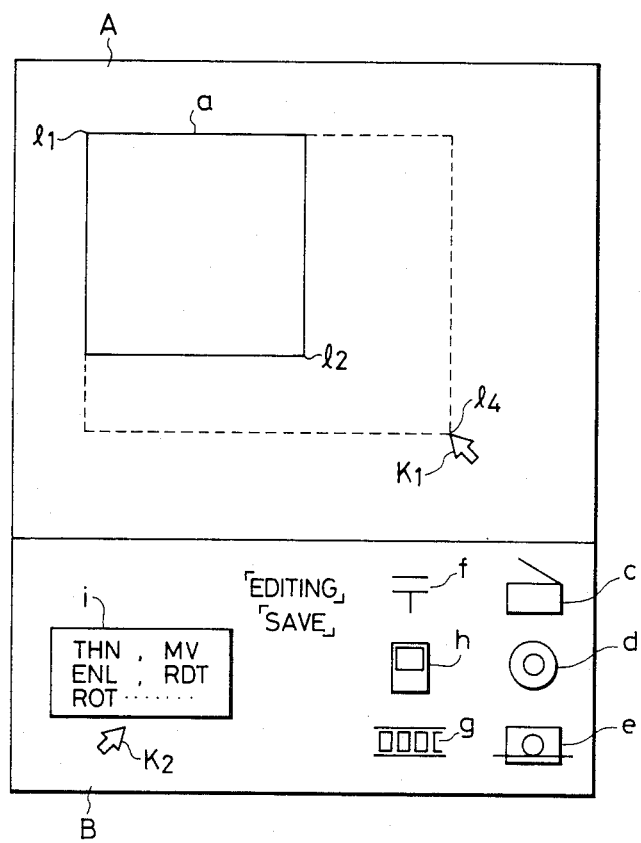
Figure 14D:
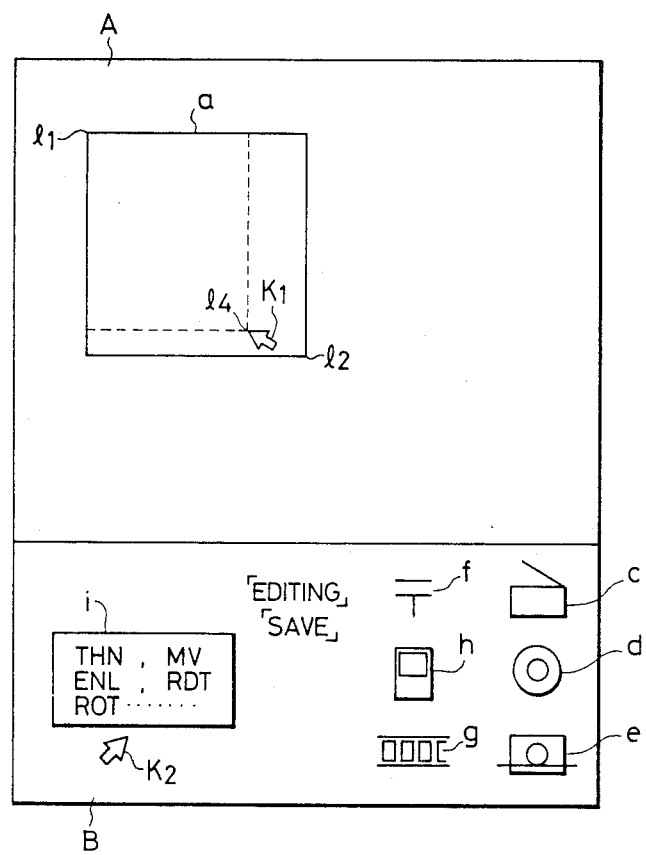

As the fourth example of the cursor command, there may be given the image editing. That is to say, when the "editing" in the command area B is designated by the command cursor k2, the editing table i is displayed at the left side of the command area B, as shown in FIG. 14(b). Of the table, when the "cut-out" is designated by the command cursor k2, and the cut-out position of the image which has already been displayed in the command area A is designated by the command cursor k1 at two points such as the two points in the coordinate $l_1 \rightarrow l_2$, the designated portion is cut out. When the other point $l_3$ (not shown) is designated and the "shifting" in the table is designated by the command cursor k2, $l_1$ also shifts, in a manner similar to $l_2$ and comes to the position of $l_3$, and the image of a shifts in its original size. Those images remaining after the cutting out operation can be extinguished by the command, although they may be left as they are. However, a portion overlapping with the cut-out image a' which has been shifted on the image surface will not be displayed. After the cut-out, when the "enlargement" in the editing table is designated by the command cursor k2, the cut-out image is fixed at $l_1$, and $l_2$ is elongated to an arbitrary position $l_4$ (not shown) to be designated by the command cursor k1, and displayed. In this case, the ratio of enlargement in both X and Y directions may differ in some cases. When "size-reduction" is designated, inversion to the above takes place as shown in FIG. 14(d). This scale changing operation is effected by performing the bit-increasing and the bit-thinning of the image data in the principal memory during transfer of the data to the memory RAM in CRT. When the "rotation" in the editing table and a rotational angle are designated, the image a is able to rotate at a designated angle such as, for example, 90 degrees. The cut-out, rotation, shifting, and other operations can be done by controlling the X and Y addresses in the principal memory on the basis of the coordinate data and the angle data to be designated by the command cursor k1.

As a fifth example of the command, there may be given "save". When this command is designated by the cursor k2, the image designated by the cursor k1, i.e., the full image surface or a cut-out image is stored in the "save" memory area in RAM 34, whereby the clipped image a in FIG. 14(a), for example, can be saved. Next, when "pattern", "graph", and "sentence" are designated, coded data of these commands, which have been newly forwarded from other stations and stored in the memory separate from the original image element, are developed as new image element data, and displayed on CRT 8. In this case, too, the aforementioned editing process such as "cut-out (or clip)", etc. can be done as in the case of the read-out image. In FIG. 14(a), a reference letter "b" designates an example of the graph, and "i" denotes an example of sentence, these being displayed at their positions in the drawing by designation of the command "shifting". Next, when "synthesis" is designated, the image "a" which has so far been saved in the save memory area is recalled to a vacant position by shifting of "b" and "i" to designate it with a2, and displayed at the position, whereby the image editing is completed as shown in FIG. 14. The bar graph "b" can be converted into a table by designating the command "table/graph conversion", and displayed at this position. Also, by designation of "circle/bar graph conversion", such bar graph can be converted into a circular graph. These conversions are constructed by first storing a predetermined design pattern in the form of code, and then selecting such coded pattern in accordance with the transmitted coded data or those prepared in the work station WS1. Sentences and graphs may also be prepared in utilization of the word processor function and the office computer function of the work station.

The edited image on CRT 8 such as the above-mentioned "cut-out" image, "synthesized" image, etc. can be printed by the printer 3 or stored in the optical disc file 4. Also, they can be transmitted simultaneously to other stations by use of the network CNET through the above-mentioned command "simultaneous broadcasting", etc.

The image processing system according to the present invention is capable of performing not only processing of a monochromatic image as mentioned in the foregoing, but also processing of color images in multicolor, full color, etc. by providing an input/output device for the color images such as, for example, a color image scanner, color printer, etc., as a component unit for the system.

In this color image processing, too, the editing function of the previously explained work station is executed. More specifically, by expanding the above-mentioned image signal processing, each color signal of blue (B), green (G), and red (R), for example, is processed either in parallel or in sequence, whereby various processes on the color image such as clipping, shifting enlargement, size-reduction, rotation, etc. of the color image, and synthesis of the color image and the input characters, symbols, etc. can be executed in the dialogue type with the CRT picture surface, as is the case with the aforementioned procedures. Furthermore, in addition to the above-mentioned editing function, there can be effected the color conversion processing specific to the color image such as, for example, "negative/position reversal" by complementary color conversion of input color signals, or "extraction/erasure" of a desired color image from the color image, and other conversion processes.

As the image signals for color processing, various signals can be input to the system, such as photo-taking output from a video-camera, output from a video-recorder, color image signals from a personal computer, etc. These signals are processed simultaneously or sequentially at the work station to be synthesized with a color original as read out. It is also possible that desired input characters or letters from the word processor can be colored and produced as color output.

As mentioned in the foregoing, the color images as edited are sent to the printer, display, file, etc. which are directly connected with the work station so as to be printed, displayed, stored, or transmitted to other stations through the network CNET, where the printing and displaying of the color images are executed by the color printer and the color display in the stations. However, if this other station is incapable of color-processing, such color image is converted to a monochromatic signal for output.

In the station where the color image scanner or the color printer is provided, such scanner and printer can be operated as the color reproduction machine by means of the above-mentioned pass-mode.

By the editing function of the color image, there can be effected various processes such that a part of the color image which has been read out or transmitted is extracted for printing in full color, or a desired portion of such color image is recorded in full color and the remaining portion is recorded in a monochromatic tone.

FIGS. 13(d) and 13(e) are flow charts which show programs to achieve the control operations when executing the information transmission through the local area network LAN, as well as executing the image editing in the work station, in addition to the control operations of the image processing system according to the present invention as have been explained with reference to FIGS. 13(a) to 13(c).

The control operations shown in FIGS. 13(d) and 13(e) are inserted between the control operations shown in FIGS. 13(a) and 13(b).

As mentioned in the foregoing, various coded images such as patterns, graphs, sentences, etc. from the designated devices inclusive of the external work station through the local area network LAN (CNET) are input into each of the work stations in the form of the read-out image or in the form of image element data. In this instance, there is added to the image a discriminating symbol indicating the content and kind of image, which are stored in a predetermined area in the principal memory 34. If the editing command is input from the keyboard and the point device in the work station, the operational sequence proceeds from the step S45 to the steps S46, S63, S66 and S69 where judgement is made as to whether the editing command for which data has been input. If the editing command is for the high speed reader 2 connected to one work station, the read-out image output from the microfilm file and the optical disc file, or the read-out image from another work station input from LAN (CNET), the operational sequence proceeds from the step S46 to the step S47 where the read-out image stored in a predetermined area of the principal memory 34 as mentioned in the foregoing is stored again in the area M1 in the principal memory, and is displayed on CRT 8. Further, in conformity with the contents of the editing process, the above-mentioned step is performed at the step S100. At the step S100, if the cut-out command of the displayed image has been input at the step S48, an image in a region designated by the point device at the step S49 as mentioned above is extracted, and the read-out data corresponding to the extracted image from the area M1 in the principal memory 34 are stored again at step S50 into the M1 area in the principal memory 34. On the other hand, if the enlarging command has been input, the operational sequence proceeds from the step S51 to the step S52 by the point device where the image in the area M1 of the principal memory 34 is enlarged in accordance with the enlargement ratio based on the input image area. At the step S53, then, the image is stored again in the area M1 of the principal memory 34. If the size-reduction command has been input, the operational sequence proceeds from the step S54 to the step S55 where the image in the area M1 of the principal memory 34 is reduced at a designated reduction ratio, and then, at the step 56, the reduced image is stored again in the area M1 of the principal memory 34. If the command for rotation of the image has been input, the sequence proceeds from the step S57 to the step S58 where the address conversion of the principal memory 34 is effected in accordance with a designated rotational angle to thereby perform the rotational operation of the area M1. Then, at step S59, the image is stored again in the area M1 of the principal memory. On the other hand, if the command for shifting the image has been input, the operational sequence proceeds from the step S60 to S61 where the image in the area M1 of the principal memory is shifted to a position designated by the point device (shifting quantity). Then, at the step S62, the image is stored again in the area M1 of the principal memory 34. As soon as each of the above explained processes has been completed and the thus read-out image has been reentered into the area M1 of the principal memory 34, a judgement is made as to whether or not all of the editing operations as instructed at the step S71 have been completed. If not completed yet, the sequence returns to the step S46, and starts again from the steps S46 and S47 to perform the required editing operations at the step S100. More specifically, if the read-out image is first cut out, then the cut-out image is enlarged, and the enlarged image is further shifted. The operations at the step S100 for the edition of the read-out image will be executed three times. The same operations at the step S100 are performed in a procedure reverse to the above such as rotation of the read-out image, size-reduction of the read-out image, extraction from the image, and so forth. The editing operations can be monitored on real-time by means of CRT 8.

As soon as the editing operations for the read-out image have been terminated, judgement is made at step S71 as to whether or not there is any demand on the editing process for other images. If there is any, the sequence returns to the step S46, and further judgement is made at the steps S63 and S64 for which image the editing instruction has been input. Based on the judgement made, each of the images is stored in the areas M2, M3, and M4 of the principal memory at each of the steps S64, S67, and S69 in accordance with the editing instruction for the patterns, graphs, and sentences which have been input in the form of the coded images. At the next steps (S65, S68, S70), similar editing operations to those done at the step S100 where the above-mentioned for the read-out image have been subjected to the editing process are carried out, and the thus edited images are stored again in the areas M2, M3, and M4 of the principal memory 34. In this case, the images which have already been edited may be displayed continuously on CRT, or erased therefrom by the above-mentioned "save" command.

As mentioned in the foregoing, when the editing operations have been completed on each image in compliance with the editing instructions obtained by repeating, executing and inputting of the processes at the steps S46 through S71, the sequence proceeds to the step S72 where a judgement is made as to whether or not synthesis of the edited images has been instructed. If the instruction for the synthesis has been issued, the sequence proceeds to step S73 where the image, the synthesis of which has been instructed, is read out to a position designated by the point device from a corresponding area in the principal memory 34, as mentioned in the foregoing, and the thus read-out image is further stored in the area M5 of the principal memory 34 at the step S74. More specifically, when the read-out image as edited is to be synthesized with a graph, the read-out image is read out of the area M1 of the principal memory 34, and the coded image of the graph out of the area M3 of the same memory, after which both images are stored in the area M5 of the principal memory 34 corresponding to the designated synthesizing position, whereby a synthesized image of the read-out image and the graph is stored in the area M5 of the principal memory 34. Upon execution of this synthesizing process, the sequence proceeds to the step S75. In this instance, the synthesized image is displayed on CRT 8. In the absence of a command for the synthesis, the sequence also proceeds from the step S72 to the step S75.

At the step S75, judgement is made on input of the output form command such as recording, display, and so on of the image information. In case the image synthesizing process has been done at the above-mentioned steps S72 to S74, and the thus synthesized image is output in full, the sequence proceeds to the step S76. In order to output an image in the area M5 where the synthesized image has been stored, the transfer operation is effected at the step S77 whereby the image is transferred from the area M5 to M6 of the principal memory 34. In case the read-out image alone is to be output from the synthesized image, the sequence proceeds from the step S78 to the step S79 where the read-out image stored in the area M1 alone is transferred to the area M6. Further, when a design pattern alone is to be output, the sequence proceeds from the step S80 to the step S81 where only the pattern image in the area M2 is stored in the area M6. Furthermore, when a graph alone is to be output, the sequence proceeds from the step S82 to the step S83 where the graphic image in the area M3 is stored in the area M6. Further, when a sentence alone is to be output, the sentence image is transferred from the area M4 to the area M6. In this way, the image, for which a kind of output has been designated, is transferred to the area M6 of the principal memory 34 to wait for the output instruction. Incidentally, the absence of the output form instruction signifies that the above-mentioned editing and synthesizing processes have not been effected. Hence, the sequence proceeds to the step S85.

At the step S85, judgement is made as to whether or not an image output instruction has been input by use of the LAN into another work station WS. If no output instruction using LAN has been input, the sequence proceeds to the step S15 of FIG. 13(b), and the image output is effected by selecting any of the output apparatuses connected with the first work station WS, such as the CRT 8, image film 4, high speed printer 3, soft display 6, and small-sized printer 7. On the other hand, if the image transfer to another work station WS using LAN has been selected at the step S85, the output of the image to the output apparatus in the first work station WS is prohibited, and the form of output image is selected by the steps S86 and S88. If simultaneous broadcasting to a plurality of work stations has been selected, the sequence proceeds from the step S86 to the step S87 where LIU of the communication interface 36 is set to be capable of simultaneous broadcasting, after which the sequence proceeds further to the step S91. If the sequential broadcasting for sequential image outputs to a plurality of the work stations WS has been selected, the sequence proceeds from the step S88 to the step S89 where the LIU is set to be capable of sequential broadcasting, after which the sequence proceeds to the step S91. On the other hand, if no image output to a plurality of the work stations WS has been selected, but to a single work station WS, the sequence proceeds to the step S90 where the LIU is set as such, after which the sequence proceeds to the step S90. At the step S91, the image output from the principal memory is effected through the LAN to another station in accordance with the state of the LIU as it has been set at the steps S87, S89, and S90.

As stated in the foregoing, in the case of a plurality work stations WS having been connected by the local area network LAN (CNET), and of the editing operations being executed on the image input in the work stations, the control operations as shown in FIGS. 13(d) and 13(e) are carried out between the control operations as shown in FIGS. 13(a) and 13(b), whereby the edition and synthesis of images and the image transmission to another work station become controllable together. Furthermore, the edition, transmission, and other processes can be easily executed in the same manner for the multi-colored or full colored images, besides the monochromatic images.

What is claimed is:

1. An image processing system, comprising:
   reading means for photoelectrically reading an image and generating image data representing said image;
   processing means for processing the generated image data for the purpose of editing the read image;
   displaying means for displaying an edited image according to image data received from said processing means;
   recording means for recording on a recording medium the image edited according to the image data received from said processing means; and
   transferring means for transferring the image data from said processing means through a transmission line to at least one apparatus connected to the transmission line,
   wherein said display means is adapted to display a plurality of apparatus connected to the transmission line, and said transferring means is adapted to transfer the processed image data through the transmission line to at least one apparatus selected from the plurality of apparatus displayed on said displaying means.

2. An image processing system according to claim 1, wherein said displaying means is adapted to display the image in a frame.

3. An image processing system according to claim 1, wherein said processing means is adapted to process code data representing a character image.

4. An image processing system according to claim 1, wherein said processing means is adapted to effect color processing of the image data.

5. An image processing system according to claim 1, wherein said reading means is adapted to photoelectrically read an image recorded on a film.

6. An image processing system according to claim 1, wherein said processing means comprises manual operable means for inputting a desired editing instruction for modifying the image data and for inputting an instruction for selecting at least one apparatus from among the plurality of apparatus displayed on said displaying means, for transfer of the image data to the selected apparatus.

7. An image processing system, comprising:
   first entering means for entering picture element data representing a document image;
   second entering means for entering code data representing a character image;
   processing means for processing the entered picture element data and the code data to synthesize the document image and the character image in a frame;
   displaying means for displaying a frame of a synthesized image of the document image and the character image, according to the processed picture element data and the code data;

transmitting means for transmitting the processed data to other apparatus either in a first mode, or in a second mode; and designating means for designating either the first mode or the second mode;

wherein said transmitting means is adapted to transmit both the processed picture element data and the processed code data representing the synthesized image in the first mode, and to selectively transmit either the processed picture element data or the processed code data representing a document image or a character image within the synthesized image in the second mode.

8. An image processing system according to claim 7, wherein said processing means comprises means for recording, on a recording medium, an image identical to that displayed by said displaying means.

9. An image processing system according to claim 7, wherein said transmitting means is adapted to transmit the picture element data and the code data, separately.

10. An image processing system according to claim 7, wherein said transmitting means comprises a plurality of transmission line and is adapted to transmit the picture element data and the code data through separate transmission lines.

11. An image processing system according to claim 7, wherein said first entering means comprises reading means for photoelectrically reading an image and generating picture element data.

12. An image processing system according to claim 7, wherein said processing means comprises manual operable means for inputting an instruction for an image processing operation.

13. An image processing system according to claim 7, wherein said transmitting means of one station is adapted to transmit to a processing means of another station through a local area network.

14. An image processing system according to claim 7, wherein said processing means comprises memory means for storing picture element data and code data, separately.

* * * * *

UNITED STATES PATENT AND TRADEMARK OFFICE
CERTIFICATE OF CORRECTION

PATENT NO. : 4,760,458

DATED : July 26, 1988

INVENTOR(S) : YASUHIRO WATANABE, ET AL.

It is certified that error appears in the above-identified patent and that said Letters Patent is hereby corrected as shown below:

IN THE DRAWINGS

Sheet 16, Figure 13(f), "PRESNET" should read --PRESENT-- (both occurrences).

COLUMN 1

Line 65, "input output" should read --input/output--.

COLUMN 4

Line 53, "image 4" should read --image file 4--.

COLUMN 5

Line 47, "originals" should read --original--.

COLUMN 6

Line 15, "supplied" should read --supplies--.

COLUMN 12

Line 16, "net work," shoud read --network,--.

COLUMN 13

Line 35, "instruction," should read --instruction--.

UNITED STATES PATENT AND TRADEMARK OFFICE
CERTIFICATE OF CORRECTION

PATENT NO. : 4,760,458
DATED : July 26, 1988
INVENTOR(S) : YASUHIRO WATANABE, ET AL.

It is certified that error appears in the above-identified patent and that said Letters Patent is hereby corrected as shown below:

COLUMN 15

Line 37, "smaller" should read --small--.
    Line 59, "Figure." should read --Figure 1.--.

COLUMN 17

Line 12, "image file," should read --image file 4,--.
    Line 56, "image file 1." should read --image file 4.--.

COLUMN 18

Line 9, "image file 1," should read --image file 4,--.

COLUMN 21

Lines 25-26, "whether the editing command for which data" should read --for which data the editing command--.
    Line 56, "step 56," should read --step S56,--.

COLUMN 22

Line 14, "edition" should read --editing--.

COLUMN 23

Line 40, "image film 4," should read --image file 4,--.
    Line 61, "step S90." should read --step S91.--.
    Line 68, "of" should be deleted.

UNITED STATES PATENT AND TRADEMARK OFFICE
CERTIFICATE OF CORRECTION

PATENT NO. : 4,760,458

DATED : July 26, 1988

INVENTOR(S) : YASUHIRO WATANABE, ET AL.

It is certified that error appears in the above-identified patent and that said Letters Patent is hereby corrected as shown below:

COLUMN 24

Line 4, "edition" should read --editing--.
    Line 7, "edition," should read --editing,--.

COLUMN 26

Line 3, "line" should read --lines--.

Signed and Sealed this

Seventh Day of March, 1989

*Attest:*

DONALD J. QUIGG

*Attesting Officer*     *Commissioner of Patents and Trademarks*